United States Patent
Takeuchi et al.

(10) Patent No.: US 9,934,307 B2
(45) Date of Patent: Apr. 3, 2018

(54) APPARATUS AND METHOD FOR MANAGING JOB FLOWS IN AN INFORMATION PROCESSING SYSTEM

(71) Applicant: FUJITSU LIMITED, Kawasaki-shi, Kanagawa (JP)

(72) Inventors: Yukihiro Takeuchi, Akashi (JP); Shotaro Okada, Nishinomiya (JP); Masayuki Sakemoto, Kobe (JP); Keigo Mitsumori, Kobe (JP); Yutaka Arakawa, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 15/075,693

(22) Filed: Mar. 21, 2016

(65) Prior Publication Data
US 2016/0292006 A1    Oct. 6, 2016

(30) Foreign Application Priority Data
Apr. 2, 2015  (JP) .................................. 2015-076083

(51) Int. Cl.
G06F 9/46      (2006.01)
G06F 17/30     (2006.01)
G06F 9/48      (2006.01)

(52) U.S. Cl.
CPC ...... *G06F 17/30598* (2013.01); *G06F 9/4843* (2013.01)

(58) Field of Classification Search
None
See application file for complete search history.

(56) References Cited

U.S. PATENT DOCUMENTS

| 5,459,866 A | 10/1995 | Akiba et al. | |
| 8,424,003 B2* | 4/2013 | Degenaro | G06F 9/5033 718/101 |
| 8,533,718 B2* | 9/2013 | Yamaguchi | G06F 9/5027 718/101 |

(Continued)

FOREIGN PATENT DOCUMENTS

| JP | 63-241605 | 10/1988 |
| JP | 6-83598 | 3/1994 |
| JP | 2008-3709 | 1/2008 |

(Continued)

*Primary Examiner* — Kenneth Tang
(74) *Attorney, Agent, or Firm* — Staas & Halsey LLP

(57) ABSTRACT

An apparatus manages job flows in an information processing system. In response to a request from a monitoring terminal, the apparatus creates, based on attribute information of jobs included in job flows to be managed, classification information in which the jobs are classified by attributes thereof. The apparatus groups the jobs into groups according to the attribute information by using the classification information and information on transition relationships between the jobs, and creates job-execution-schedule display information with which a transition relationship between a first job and a second job subsequent to the first job is displayed when the first and second jobs belong to different groups, and with which an execution interval of jobs in each group is displayed in association with that of jobs in another group, based on the number of jobs that have been sequentially executed from a starting job to each job in a job flow.

5 Claims, 48 Drawing Sheets

(56) References Cited

U.S. PATENT DOCUMENTS

2010/0115520 A1* 5/2010 Kohno .................. G06F 9/4881
  718/101
2011/0154360 A1 6/2011 Kikuchi et al.

FOREIGN PATENT DOCUMENTS

| | | |
|---|---|---|
| JP | 2010-166336 | 7/2010 |
| JP | 2011-128828 | 6/2011 |

* cited by examiner

FIG. 3

| BRANCH/<br>BASE NUMBER | JOB NAME |
|---|---|
| 0001 (BRANCH A) | BRANCH A-1, BRANCH A-2, BRANCH A-3, BRANCH A-4, BRANCH A-5 |
| 0002 (BRANCH B) | BRANCH B-1, BRANCH B-2, BRANCH B-3, BRANCH B-4, BRANCH B-5 |
| 0003 (BRANCH C) | BRANCH C-1, BRANCH C-2, BRANCH C-3 |

FIG. 4  16-1

| JOB CLASSIFICATION INFORMATION | JOB NAME |
|---|---|
| 0001 | BRANCH A-1, BRANCH A-2, BRANCH A-3, BRANCH A-4, BRANCH A-5 |
| 0002 | BRANCH B-1, BRANCH B-2, BRANCH B-3, BRANCH B-4, BRANCH B-5 |
| 0003 | BRANCH C-1, BRANCH C-2, BRANCH C-3 |

FIG. 7

| GROUP NAME | JOB IN GROUP | JOB CLASSIFICATION INFORMATION |
|---|---|---|
| GrpA-1 | BRANCH A-1, BRANCH A-2, BRANCH A-3, BRANCH A-4, BRANCH A-5 | 0001 |
| GrpB-1 | BRANCH B-1 | 0002 |
| GrpB-2 | BRANCH B-2 | 0002 |
| GrpB-3 | BRANCH B-3 | 0002 |
| GrpB-4 | BRANCH B-4, BRANCH B-5 | 0002 |
| GrpC-1 | BRANCH C-1, BRANCH C-2, BRANCH C-3 | 0003 |

FIG. 9

| GROUP NAME | JOB IN GROUP | JOB CLASSIFICATION INFORMATION | SUBSEQUENT GROUP |
|---|---|---|---|
| GrpA-1 | BRANCH A-1, BRANCH A-2, BRANCH A-3, BRANCH A-4, BRANCH A-5 | 0001(BRANCH A) | GrpB-1, GrpB-2, GrpC-1 |
| GrpB-1 | BRANCH B-1 | 0002(BRANCH B) | GrpC-1 |
| GrpB-2 | BRANCH B-2 | 0002(BRANCH B) | GrpC-1 |
| GrpB-3 | BRANCH B-3 | 0002(BRANCH B) | GrpC-1 |
| GrpB-4 | BRANCH B-4, BRANCH B-5 | 0002(BRANCH B) | GrpA-1, GrpC-1 |
| GrpC-1 | BRANCH C-1, BRANCH C-2, BRANCH C-3 | 0003(BRANCH C) | GrpA-1, GrpB-3, GrpB-4 |

FIG. 11

| JOB NAME | DISTANCE (NUMBER OF ARROWS FROM FIRST JOB) |
|---|---|
| BRANCH A-1 | 0 |
| BRANCH A-2 | 1 |
| BRANCH A-3 | 2 |
| BRANCH A-4 | 3 |
| BRANCH A-5 | 5 (DISTANCE INCLUDES 4 AND 5, MAXIMUM 5) |
| BRANCH B-1 | 1 |
| BRANCH B-2 | 1 |
| BRANCH B-3 | 3 |
| BRANCH B-4 | 2 |
| BRANCH B-5 | 3 |
| BRANCH C-1 | 1 |
| BRANCH C-2 | 2 |
| BRANCH C-3 | 4 (DISTANCE INCLUDES 3 AND 4, MAXIMUM 4) |

FIG. 13

| GROUP NAME | JOB IN GROUP | JOB CLASSIFICATION INFORMATION | SUBSEQUENT GROUP CONNECTING INTERVAL IN PARENTHESES | EXECUTION INTERVAL |
|---|---|---|---|---|
| GrpA-1 | BRANCH A-1, BRANCH A-2, BRANCH A-3, BRANCH A-4, BRANCH A-5 | 0001(BRANCH A) | GrpB-1(0→1), GrpB-2(0→1), GrpC-1(0→1) | 0 TO 5 |
| GrpB-1 | BRANCH B-1 | 0002(BRANCH B) | GrpC-1(1→2) | 1 |
| GrpB-2 | BRANCH B-2 | 0002(BRANCH B) | GrpC-1(1→2) | 1 |
| GrpB-3 | BRANCH B-3 | 0002(BRANCH B) | GrpC-1(3→4) | 3 |
| GrpB-4 | BRANCH B-4, BRANCH B-5 | 0002(BRANCH B) | GrpA-1(2→3, 3→5), GrpC-1(2→4) | 2 TO 3 |
| GrpC-1 | BRANCH C-1, BRANCH C-2, BRANCH C-3 | 0003(BRANCH C) | GrpA-1(4→5), GrpB-3(2→3), GrpB-4(1→2) | 1 TO 4 |

FIG. 18

| RELATIONS BETWEEN GROUPS | PRE-REDUCTION CONNECTING INTERVAL | POST-REDUCTION CONNECTING INTERVAL | POST-REDUCTION ARROW ID | BI-DIRECTIONAL DETERMINATION FLAG |
|---|---|---|---|---|
| A→B | 0→1 | 0→0 | 1 | YES |
| B→C | 0→1 | 0→0 | 2 | YES |
| A→B | 1→2 | 0→0 | 1 | YES |
| C→B | 0→1 | 0→0 | 2 | YES |
| B→A | 2→4 | 0→0 | 1 | YES |
| B→C | 2→3 | 0→0 | 2 | YES |
| C→B | 3→4 | 0→0 | 2 | YES |
| C→A | 4→5 | 0→1 | 3 | NO |
| A→C | 5→6 | 1→1 | 4 | YES |
| A→C | 6→7 | 1→1 | 4 | YES |
| C→A | 7→8 | 1→1 | 4 | YES |

FIG. 20

| JOB NUMBER | SUBNET INFORMATION | ABNORMALITY NOTIFICATION ADDRESS | BRANCH/ BASE NUMBER |
|---|---|---|---|
| 1 | 192.168.30.0 | – | 1 |
| 2 | 192.168.31.0 | – | 2 |
| 3 | 192.168.31.0 | – | 2 |
| 4 | – | shitenC@test.com | 3 |
| 5 | 192.168.30.0 | shitenA@test.com | 1 |
| 6 | – | shitenC@test.com | 3 |
| 7 | 192.168.31.0 | – | 2 |
| 8 | 192.168.30.0 | shitenA@test.com | 1 |
| 9 | 192.168.31.0 | – | 2 |
| 10 | 192.168.31.0 | – | 2 |
| 11 | 192.168.30.0 | shitenA@test.com | 1 |
| 12 | – | shitenC@test.com | 3 |
| 13 | 192.168.30.0 | – | 1 |

FIG. 21

| BRANCH/<br>BASE NUMBER | JOB NUMBER |
|---|---|
| 1 | 1, 5, 8, 11, 13 |
| 2 | 2, 3, 7, 9, 10 |
| 3 | 4, 6, 12 |

| JOB NUMBER | JOB NAME | SUBSEQUENT JOB NUMBER |
|---|---|---|
| 1 | SysA-INITIALIZATION PROCESS | 2, 3, 4, 5 |
| 2 | SysB-PROCESS START FOR TODAY | 6 |
| 3 | SysB-PROCESS START FOR TODAY 2 | 6 |
| 4 | SysC-PROCESS START FOR TODAY | 6, 7 |
| 5 | SysA-PROCESS START FOR TODAY | 8 |
| 6 | SysC-CALCULATION PROCESS | 9, 12 |
| 7 | SysB-REFLECTION OF PREVIOUS DAY'S INFORMATION | 10, 11, 12 |
| 8 | SysA-CREATE DATA FOR DAY AFTER TOMORROW | 11 |
| 9 | SysB-CALCULATION PROCESS | 12 |
| 10 | SysB-CREATE INFORMATION FOR DAY AFTER TOMORROW | 13 |
| 11 | SysA-REFLECTION OF BRANCH B'S PREVIOUS DAY'S INFORMATION | 13 |
| 12 | SysC-TALLYING PROCESS | 13 |
| 13 | SysA-POST-PROCESSING | - |

| JOB CLASSIFICATION INFORMATION | JOB NUMBER |
|---|---|
| 1 | 1, 5, 8, 11, 13 |
| 2 | 2, 3, 7, 9, 10 |
| 3 | 4, 6, 12 |

FIG. 27   73

| JOB NUMBER | CHARACTER STRING TOKEN | SCHEDULED ACTIVATION DATE INFORMATION | JOB CLASSIFICATION INFORMATION |
|---|---|---|---|
| 1 | — | WEEKDAYS, 2ND AND 4TH SATURDAY EVERY MONTH | 1 |
| 2 | — | WEEKDAYS | 2 |
| 3 | — | WEEKDAYS | 2 |
| 4 | — | EVERY MONDAY, WEDNESDAY, THURSDAY | 3 |
| 5 | — | WEEKDAYS | 1 |
| 6 | — | EVERY MONDAY, WEDNESDAY, THURSDAY | 3 |
| 7 | — | WEEKDAYS | 2 |
| 8 | — | WEEKDAYS, 2ND AND 4TH SATURDAY EVERY MONTH | 1 |
| 9 | — | WEEKDAYS | 2 |
| 10 | — | WEEKDAYS | 2 |
| 11 | — | WEEKDAYS, 2ND AND 4TH SATURDAY EVERY MONTH | 1 |
| 12 | — | EVERY MONDAY, WEDNESDAY, THURSDAY | 3 |
| 13 | — | WEEKDAYS, 2ND AND 4TH SATURDAY EVERY MONTH | 1 |

FIG. 28

| GROUP NUMBER | JOB NUMBER | JOB CLASSIFICATION INFORMATION | EXECUTION INTERVAL | SUBSEQUENT GROUP NUMBER | CONNECTING INTERVAL |
|---|---|---|---|---|---|
| 1 | 1, 5, 8, 11, 13 | 1 | 0 TO 5 | 2 | 0→1 |
| | | | | 3 | 0→1 |
| | | | | 4 | 0→1 |
| 2 | 2 | 2 | 1 | 4 | 1→2 |
| 3 | 3 | 2 | 1 | 4 | 1→2 |
| 4 | 4, 6, 12 | 3 | 1 TO 4 | 1 | 4→5 |
| | | | | 5 | 1→2 |
| | | | | 6 | 2→3 |
| 5 | 7, 9 | 2 | 2 TO 3 | 1 | 2→3 |
| | | | | 4 | 2→4 |
| 6 | 8 | 2 | 3 | 4 | 3→4 |

| JOB NUMBER | DISTANCE |
|---|---|
| 1 | 0 |
| 2 | 1 |
| 3 | 1 |
| 4 | 1 |
| 5 | 1 |
| 6 | 2 |
| 7 | 2 |
| 8 | 2 |
| 9 | 3 |
| 10 | 3 |
| 11 | 3 |
| 12 | 4 |
| 13 | 5 |

| GROUP NUMBER | JOB NUMBER | JOB CLASSIFICATION INFORMATION |
|---|---|---|
| 1 | 1, 5, 8, 11, 13 | 1 |
| 2 | 2 | 2 |
| 3 | 3 | 2 |
| 4 | 4, 6, 12 | 3 |
| 5 | 7, 9 | 2 |
| 6 | 8 | 2 |

FIG. 31

| GROUP NUMBER | JOB NUMBER | JOB CLASSIFICATION NUMBER | SUBSEQUENT GROUP NUMBER |
|---|---|---|---|
| 1 | 1, 5, 8, 11, 13 | 1 | 2 |
| | | | 3 |
| | | | 4 |
| 2 | 2 | 2 | 4 |
| 3 | 3 | 2 | 4 |
| 4 | 4, 6, 12 | 3 | 1 |
| | | | 5 |
| | | | 6 |
| 5 | 7, 9 | 2 | 1 |
| | | | 4 |
| 6 | 8 | 2 | 4 |

FIG. 32

| JOB CLASSIFICATION INFORMATION | GROUP NUMBER | EXECUTION INTERVAL | SUBSEQUENT JOB CLASSIFICATION INFORMATION | CONNECTING INTERVAL | DISPLAY STATE | STATE DISPLAY POSITION | CLOSING TIME |
|---|---|---|---|---|---|---|---|
| 1 | 1 | 0 TO 5 | 2 | 0→1 | RUNNING | 2 | UP TO 06:00 |
| | | | 3 | 0→1 | | | |
| 2 | 2, 3, 5, 6 | 1 | 3 | 1→2 | ABNORMAL FINISH | 3 | UP TO 24:00 (COMPLETED) |
| | | 2 TO 3 | 1 | 2→3 | | | UP TO 02:00 (DELAY) |
| | | | | 3→5 | | | |
| | | | 3 | 2→4 | | | |
| 3 | 3 | 1 TO 4 | 1 | 4→5 | RUNNING | 3 | — |
| | | | 2 | 1→2 | | | |
| | | | | 2→3 | | | |

FIG. 33

| GROUP | SUBSEQUENT GROUP | PRE-REDUCTION CONNECTING INTERVAL | POST-REDUCTION CONNECTING INTERVAL | POST-REDUCTION ARROW ID | BI-DIRECTIONAL DETERMINATION FLAG |
|---|---|---|---|---|---|
| 1 | 2 | 0→1 | 0→0 | 1 | NO |
| 1 | 3 | 0→1 | 0→0 | 2 | NO |
| 2 | 3 | 1→2 | 0→0 | 3 | YES |
| 2 | 1 | 2→3 | 0→1 | 4 | NO |
| 2 | 1 | 3→5 | 1→1 | 5 | NO |
| 2 | 3 | 2→4 | 0→1 | 6 | NO |
| 2 | 1 | 4→5 | 1→1 | 5 | NO |
| 3 | 2 | 1→2 | 0→0 | 3 | YES |
| 3 | 2 | 2→3 | 0→1 | 7 | NO |

| JOB CLASSIFICATION INFORMATION | GROUP NUMBER | EXECUTION INTERVAL | SUBSEQUENT JOB CLASSIFICATION INFORMATION | CONNECTING INTERVAL | DISPLAY STATE | STATE DISPLAY POSITION | CLOSING TIME |
|---|---|---|---|---|---|---|---|
| 1 | 1 | 0 TO 1 | 2 | 0→0 | RUNNING | 0 | UP TO 06:00 |
| | | | 3 | 0→0 | | | |
| 2 | 2 | 0 TO 1 | 3 | 0⇔0 | ABNORMAL FINISH | 1 | UP TO 24:00 (COMPLETED) UP TO 04:00 (DELAY) |
| | | | 1 | 0→1 | | | |
| | | | 3 | 0→1 | | | |
| 3 | 3 | 0 TO 1 | 2 | 0→1 | RUNNING | 1 | — |

| GROUP NAME | STATE |
|---|---|
| GrpB-3 | RUNNING |
| GrpB-4 | ABNORMAL FINISH |

APPARATUS AND METHOD FOR MANAGING JOB FLOWS IN AN INFORMATION PROCESSING SYSTEM

CROSS-REFERENCE TO RELATED APPLICATION

This application is based upon and claims the benefit of priority of the prior Japanese Patent Application No. 2015-076083, filed on Apr. 2, 2015, the entire contents of which are incorporated herein by reference.

FIELD

The embodiment discussed herein relates to apparatus and method for managing job flows in an information processing system.

BACKGROUND

A job management system for operating a plurality of jobs and for managing an execution schedule is often desired when running a daily work process such as in business activities by using an information processing system.

This type of job management system is introduced not only in the head office of the business but also in branches and bases. An operation administrator monitors and manages the smooth operation of the operation management tasks within the areas of the branches and bases.

Recently, it is common to consolidate and virtualize servers that store and manage data at each of the branches or bases to collect and manage the servers from one location. With this tendency to consolidate and virtualize servers, a small number of operation administrators monitor the virtualized and integrated servers and manage and confirm that all of the operation management tasks are operating smoothly. As a result, the number of operation management tasks to be monitored and managed by one operation administrator is increasing.

The following techniques are related to job management.

Japanese Laid-open Patent Publication No. 2008-3709 discusses a first technique for appropriately notifying a user about the conditions of a system that analyzes and displays, on an application screen of the user, management information gathered by a management server or management data from a Web service for management. In the first technique, a task dividing unit analyzes definition information in which a task flow of a composite task containing a plurality of tasks is defined, and divides the composite task into separate tasks. A task group analyzing unit classifies two or more tasks of the same level in the task flow defined in the definition information into the same task group. The task group analyzing unit classifies tasks of different levels in the task flow defined in the definition information into individual task groups and classifies the plurality of tasks contained in the composite task into two or more task groups.

Japanese Laid-open Patent Publication No. 2010-166336 discusses a second technique in which an image processing device displays a plurality of elements divided into groups included in information of jobs related to image data processing, in display regions assigned to each job on the screen for the plurality of jobs. A control unit in the second technique determines whether all the plurality of elements are able to be displayed in the display region of a first screen displayed on a display unit. For jobs that are unable to be displayed, the control unit controls the display so that all of the elements belonging to the same group as elements that fail to be displayed in the display region of the first screen, are displayed on a second screen that transitions from the first screen upon receiving a transition operation.

Japanese Laid-open Patent Publication No. 2011-128828 discusses a third technique for easily understanding an execution sequence of jobs. A computer in the third technique classifies a plurality of jobs included in log data according to whether the end time of a job belongs to any time segment among a plurality of time segments. The computer creates first data for indicating an execution sequence relationship among the jobs based on the job end times for the plurality of jobs included in a first time segment. The computer creates second data for indicating an execution sequence relationship among the jobs based on the job end times for the plurality of jobs included in a second time segment that follows the first time segment. The computer analyzes the execution sequence relationships between the jobs included in the first time segment and the jobs included in the second time segment based on the end times of the jobs included in the first time segment and the end times of the jobs included in the second time segment. The computer then creates data which indicates the execution sequence relationships of jobs that are transferred from the first time segment to the second time segment.

Japanese Laid-open Patent Publication Nos. 6-83598 and 63-241605 are examples of related art.

SUMMARY

According to an aspect of the invention, an apparatus manages job flows in an information processing system. In response to a request from a monitoring terminal, the apparatus creates, based on attribute information of a plurality of jobs included in job flows to be managed, classification information in which the plurality of jobs are classified by attributes thereof. The apparatus groups the plurality of jobs into a plurality of groups according to the attribute information by using the classification information and transition relationship information indicating transition relationships between the plurality of jobs in the job flows, and creates job-execution-schedule display information with which a transition relationship between a first job and a second job subsequent to the first job among the plurality of jobs is displayed when the first and second jobs belong to different groups, and with which an execution interval of jobs in each group is displayed in association with an execution interval of jobs in another group, based on a number of jobs that have been sequentially executed from a starting job to each job in a job flow.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a job/branch correspondence table, according to an embodiment;

FIG. 4 is a diagram illustrating an example of a job classification table, according to an embodiment;

FIG. 7 is a diagram illustrating an example of a group/job relation table, according to an embodiment;

FIG. 9 is a diagram illustrating an example of a subsequent group management table, according to an embodiment;

FIG. 11 is a diagram illustrating an example of a distance management table, according to an embodiment;

FIG. 13 is a diagram illustrating an example of an execution interval management table, according to an embodiment;

FIG. 18 is a diagram illustrating an example of a reduction display management table, according to an embodiment;

FIG. 20 is a diagram illustrating an example of a job/branch correspondence information temporary table, according to an embodiment;

FIG. 21 is a diagram illustrating an example of a job/branch correspondence table, according to an embodiment;

FIG. 25 is a diagram illustrating an example of a job relation information table, according to an embodiment;

FIG. 26 is a diagram illustrating an example of a job classification table, according to an embodiment;

FIG. 27 is a diagram illustrating an example of a job classification information temporary table, according to an embodiment;

FIG. 28 is a diagram illustrating an example of an execution interval management table, according to an embodiment;

FIG. 30 is a diagram illustrating an example of a group/job relation table, according to an embodiment;

FIG. 31 is a diagram illustrating an example of a subsequent group management table, according to an embodiment;

FIG. 32 is a diagram illustrating an example of a group display table, according to an embodiment;

FIG. 33 is a diagram illustrating an example of a reduction display management table (when reducing three intervals to one interval), according to an embodiment;

FIG. 34 is a diagram illustrating an example of a post-reduction group display table (when reducing three intervals to one interval), according to an embodiment;

FIG. 46 is a diagram illustrating an example of a group list of job classification information in selected intervals, according to an embodiment;

DESCRIPTION OF EMBODIMENT

The conditions for executing job flows including a plurality of jobs are increasing due to the virtualization and consolidation of servers used in data centers. As a result, grouping the job flows has been considered in order to simplify the monitoring of the plurality of job flows by an operation administrator.

However in the first technique, a job flow for batch tasks is often established as a flow for processing smaller units in comparison to a web service. Even when jobs in purely parallel relationships are grouped in an environment comprising a large amount of jobs, monitoring and management remains complicated because job flows containing a large amount of small groups are established. As a result, no advantage may be expected when carrying out grouping in an environment with a large amount of jobs.

In the second technique, sequence and dependency relations between groups are not considered because grouping is only carried out with simple setting information. As a result, the second technique is unable to be used for the monitoring and management of job flows of the batch tasks in which monitoring and management becomes difficult when the sequence and dependency relationships between groups are ignored.

In this way, when trying to understand the conditions of the plurality of job flows, the contents of a job schedule screen becomes complicated even if the jobs are grouped and displayed on the screen according to the first or second technique. Consequently, the conditions of the plurality of job flows may not be clearly understood by an operation administrator even when referring to such a screen.

Further, processing of the branches or bases may be synchronized for specific time periods such that "the next process will proceed so long as no notification of a problem is issued from a branch or base up until a specific time period" in the environment before the virtualization and consolidation. As a result, when jobs are executed at a plurality of bases, the operation administrator is able to synchronize the processing at the plurality of bases by using jobs partitioned into specific time periods as a guideline.

However, when servers are consolidated at data centers and the like, it is difficult to understand the correspondence relationships among the jobs at each branch or base or to understand which jobs are transitioned to which jobs thereafter.

An aspect of the embodiments discussed herein is to provide a management support technique to simplify understanding of the execution conditions of jobs and the transition relationships between jobs when monitoring a job flow.

Figure 1:
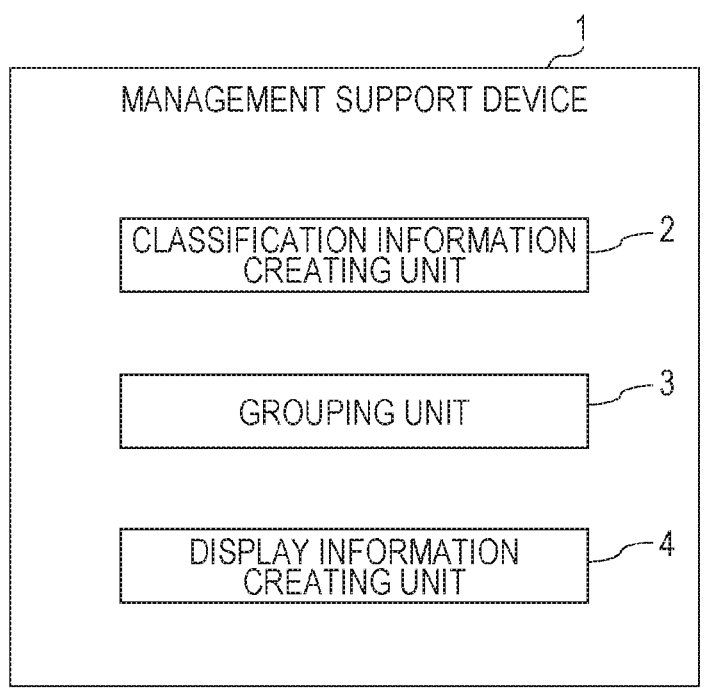
FIG. 1 is a diagram illustrating an example of a management support device, according to an embodiment.

FIG. 1 is an example of a management support device according to an embodiment. The management support device 1 includes a classification information creating unit 2, a grouping unit 3, and a display information creating unit 4.

The classification information creating unit 2 creates classification information (job classification information) in which jobs are classified into attributes based on attribute information of a plurality of jobs included in a job flow to be managed, in response to a request from an information processing terminal. A CPU 112 which executes a below mentioned extraction process 65 is provided as an example of the classification information creating unit 2.

The grouping unit 3 uses the classification information and transition relationship information pertaining to transition relationships between jobs in a job flow to group the plurality of jobs into a plurality of groups according to the attribute information. The CPU 112 which executes a below mentioned display information creating process 66 is provided as an example of the grouping unit 3. A below mentioned job relation information table 71 is provided as an example of the transition relationship information.

The display information creating unit 4 creates job execution schedule display information. The job execution schedule display information enables the display of the transition relationships between jobs to be displayed when a particular job among the plurality of jobs and a job subsequent to the particular job belong to different groups. Furthermore, the job execution schedule display information enables the display of execution intervals of jobs in each group in correspondence with the execution intervals of jobs in another group, based on the number of jobs from a starting job in the job flow to each of the jobs. The CPU 112 which executes the below mentioned display information creating process 66 is provided as an example of the display information creating unit 4. A below mentioned group monitoring diagram (FIG. 16) is provided as an example of the execution schedule display information.

According to the above configuration, understanding of the execution conditions of jobs and the transition relationships between jobs is facilitated when monitoring a job flow.

The attribute information may include information on job execution requirements. The attribute information may also include names assigned to the jobs or information on the groups.

According to the above configuration, job classification information may be extracted during operations by using the execution requirements and characteristics of the jobs.

Figure 2:
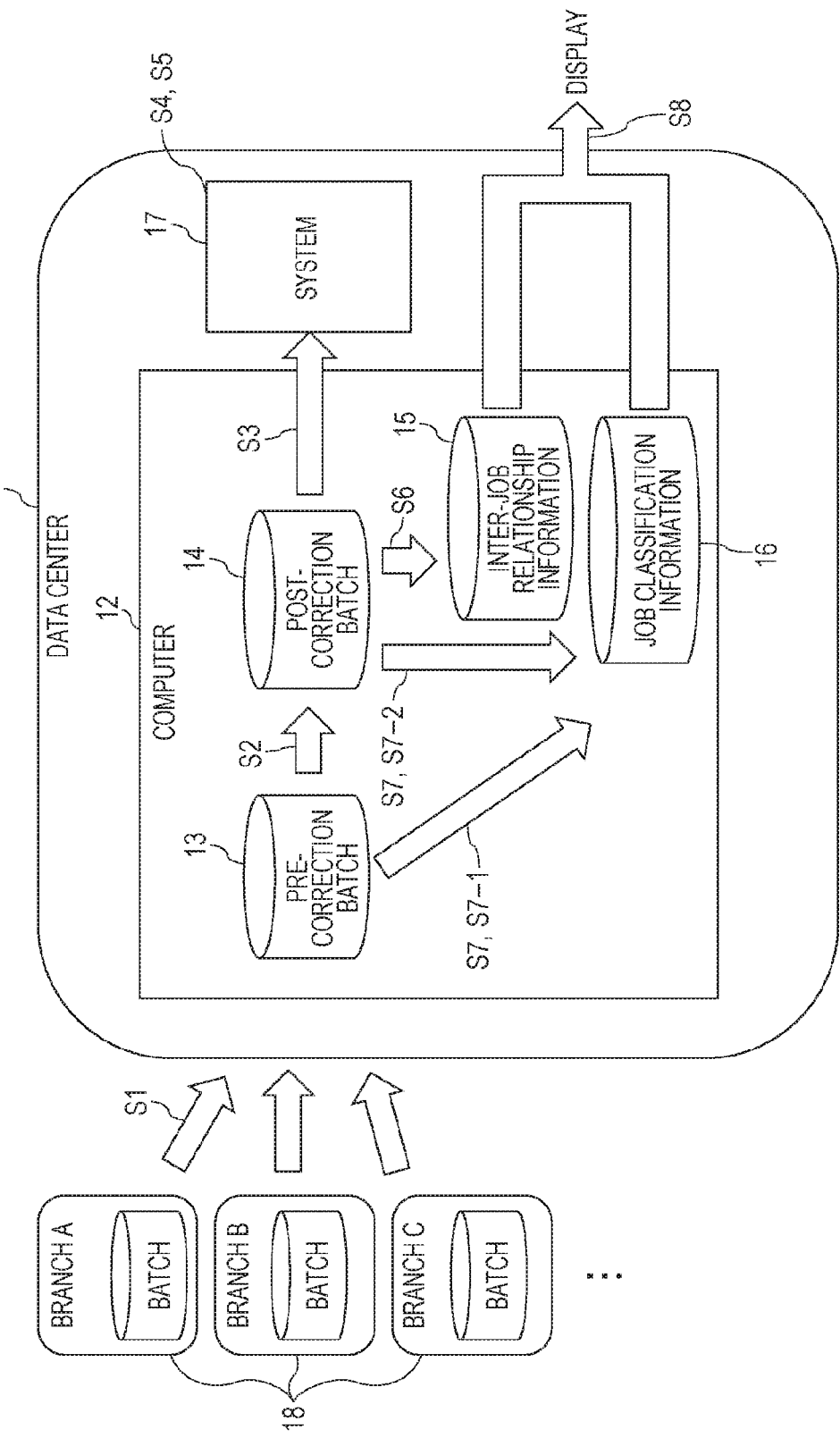
FIG. 2 is a diagram illustrating an example of a flow of a process when consolidating batch tasks and a process for managing and monitoring the batch tasks after consolidation, according to an embodiment.

FIG. 2 is a flow of a process when consolidating batch tasks and a process for managing and monitoring the batch tasks after consolidation, according to an embodiment. The process flow for batch task consolidation is described below. First, existing batch information is collected from branches and bases (18) at a data center 11 (S1).

A computer 12 at the data center 11 corrects the batch information (pre-correction batch information 13) so that the collected batch information is executed by an information processing system 17 (S2). For example, the computer 12 mechanically replaces job names, internet protocol (IP) addresses of the servers that execute the jobs, notification addresses for abnormalities, and the like, included in the batch information.

The computer 12 submits the corrected batch information (post-correction batch information 14) to the information processing system 17 (S3).

Testing to ensure that the corrected batch tasks operate properly is carried out by the information processing system 17 (S4).

An operation administrator uses the computer 12 to operate and monitor the information processing system 17 (S5).

A process flow for operating and monitoring the batch tasks after consolidation is explained next. The embodiment involves a technique for facilitating the management and monitoring of large-scale batch tasks, and enables an ideal job flow to be automatically constructed and displayed during operation management (monitoring).

The computer 12 extracts relationship information between the jobs from the job flow for forming a plurality of batch tasks (S6) and creates one job flow. The computer 12 carries out the following processing to construct an ideal job flow during the operation management (monitoring).

The computer 12 extracts classification information of jobs from the pre-correction batch information 13 during virtualization and consolidation (S7 (S7-1)). Moreover, the computer 12 extracts classification information of jobs from the post-correction batch information 14 during operation (S7 (S7-2)).

The computer 12 displays the job flow according to the grouping of the jobs based on the extracted job classification information (S8).

[S7: Job Classification Information Extraction Process]

S7-1 (Virtualization and Consolidation)

The computer 12 extracts information about the branches and bases executing the jobs from the pre-consolidation batch information 13 and classifies the jobs based on the extracted information about the branches and bases.

The batch tasks carried out at the branches and bases before consolidation are in units having specific meanings in each of the tasks. This allows the jobs to be grouped in units which have meaning in the tasks, by grouping each of the jobs among the batch tasks in branch and base units, based on the extracted information about the branches and bases.

The computer 12 creates a job/branch correspondence table that lists in a table format the correspondence relationships between each job and the branch/base information as illustrated in FIG. 3. The computer 12 then uses the job/branch correspondence table when grouping the jobs in S8.

The computer 12 extracts information indicating whether the jobs in the pre-consolidation batch information 13 are implemented at each of the branches and bases, at the timing (S2) of replacing the batch information in accordance with the post-consolidation environment in the flow when consolidating the batch tasks in FIG. 2.

Information on the branch and base at which each job was implemented before consolidation may be extracted based on the characteristics of each job, the IP address information of the servers executing the jobs, and the abnormality notification addresses for the jobs or the job flow, which are stored in the pre-consolidation batch information. The computer 12 saves the extracted correspondence relation between each job and the branch/base information, in the job/branch correspondence table as illustrated in FIG. 3.

A method for extracting information on the branches and bases where the jobs are implemented is described below.

Method for Using IP Address Information of Job Execution Servers

IP addresses of the execution servers are designated for each of jobs or for each of job flows. Subnet information of the IP address is different for each branch or base. The computer 12 uses these characteristics to determine the branch or base where the jobs are implemented, from the IP address subnet information of the execution server to which each job is set.

Method for Using Job Abnormality Notification Address

An abnormality notification address is set for each job or each job flow. Before consolidation, a different operation administrator or operator is designated for each branch and base as the abnormality notification address. As a result, the computer 12 may determine the branch or base where the job is implemented from the set abnormality notification address.

An identifier is set as branch/base information in the job/branch correspondence table because the actual name of the branch or base is not be obtained (e.g., the first item in the branch/base information is set as "ID=0001" and the second item is set as "ID=0002", etc.).

S7-2 (During Operation)

The computer 12 is able to classify each job by using the characteristics of the post-correction batch information 14 even outside of the virtualization and consolidation time (operation time). When the number of jobs is very large and monitoring becomes difficult in accompaniment to the virtualization and consolidation, the jobs may be classified with the abovementioned processing in S7-1.

However, when the virtualization and consolidation is not implemented in particular despite the environment of a large number of jobs and there is a desire to simplify the monitoring and management, or when there is a desire to carry out the grouping with another method in the post-virtualization and consolidation environment, the jobs may be classified according to the processing in S7-2 and the classified information may be stored in a table format. The computer 12 uses the obtained table when grouping the jobs in S8.

A method for extracting the job classification information during operation is described below. The computer 12 selects a suitable extraction method from among the above extraction methods and classifies the jobs.

Method for Using Correspondence Relationships of Jobs and Branch/Base Information The computer 12 is able to classify the jobs from the job/branch correspondence table (FIG. 3) obtained during the virtualization and consolidation. As illustrated in FIG. 4, the branch/base information in the job/branch correspondence table is used as-is to arrive at a job classification information 16 (job classification table 16-1).

Method for Using Characteristics of Job Names

A prefix or suffix specific to a system or batch unit may be added to the job name. For example, a system name or a batch name, such as "XX system_start process" or "YY batch_master updating process", may be added to the job name as a prefix or suffix. The computer 12 classifies the jobs based on the regularity of job names.

For example, the operator designates a "delimiter" and a "token position for classification" for job names. In this case, the computer 12 divides the job name at the delimiter and classifies the job according to the token of the designated position. For example, when the delimiter is "_" and the token position is "head", the "XX system_start process" or "YY batch_master updating process" and the like may be divided into classes such as "XX system" or "YY batch".

The prefix or suffix "branch X" may be added to the job name of a job implemented at each branch or base when correcting the batch information during virtualization and consolidation and information such as "branch A_daily batch start process" or "branch B_daily batch start process" indicating which branch or base implemented the job may be added to the job names. As a result, classification for each branch or base may also be implemented by job name.

Method for Using Scheduled Activation Date Information (Schedule Information) of Job Information about scheduled activation dates is designated for each job. Jobs with the same scheduled activation date information are jobs that are a portion of the same batch or are jobs in a related batch and thus may be considered as being activated on the same day. For example, the jobs may be operated in such a way that jobs related to batch A are activated every Monday and jobs related to batch B are activated on weekdays. As a result, the computer 12 is able to classify jobs having the same scheduled activation date information.

[S8: Job Flow Display Processing According to Job Groupings Based on Job Classification Information]

The computer 12 groups and displays the jobs from the correspondence relationships between the jobs and the job classification information extracted in S7. By grouping and displaying the jobs, the jobs may be contained easily inside a screen in a job flow in which a large number of jobs are present. Furthermore, because grouping is carried out by batch units implemented at branches or bases before consolidation or by the scheduled activation date information for each batch, it is easy to understand the relationships between the specific batch processes or between the batches.

Figure 5:
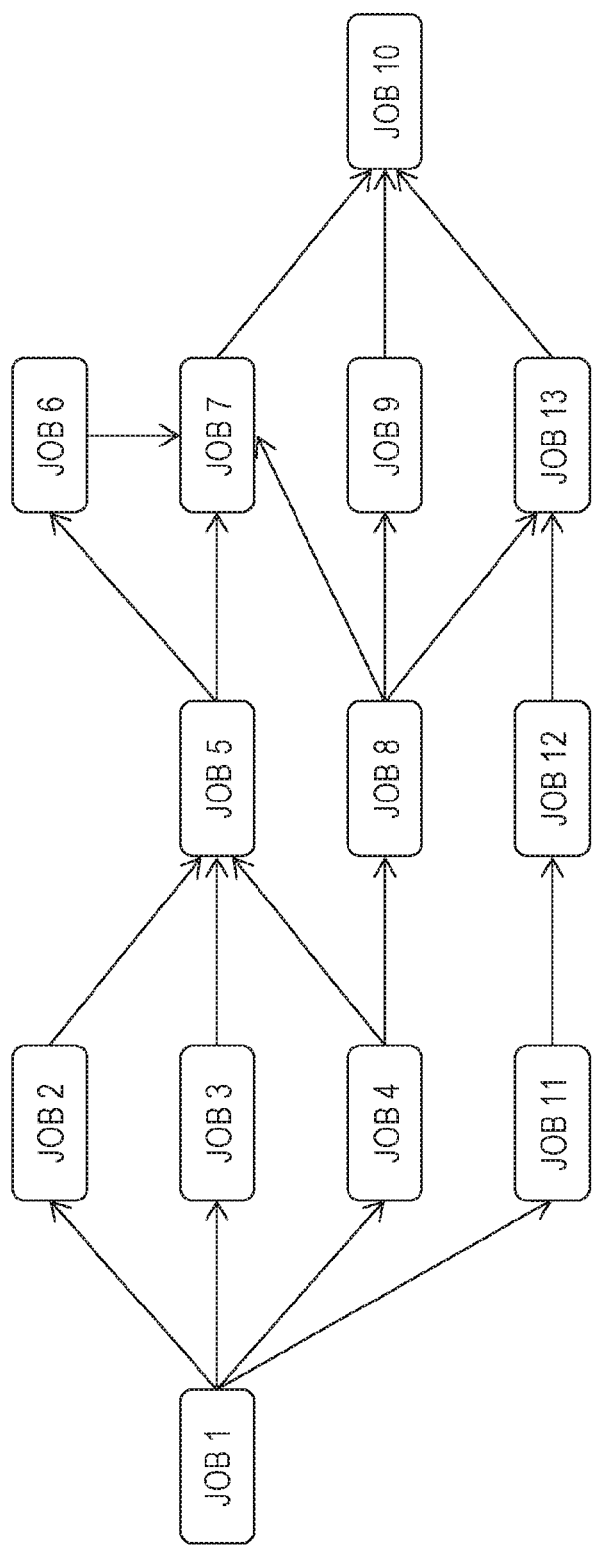
FIG. 5 is a diagram illustrating an example of inter-job relation information, according to an embodiment.

As premises for S8, before implementing the grouping, one job flow (inter-job relationship information 15) is created from a plurality of jobs by using the abovementioned third technique as illustrated in FIG. 5.

FIG. 5 is an example of inter-job relationship information 15 according to an embodiment. The computer 12 is able to clarify and group the job classifications included in the job flow depicted in FIG. 5 by using the job classification table 16-1 created in S7.

Figure 6:
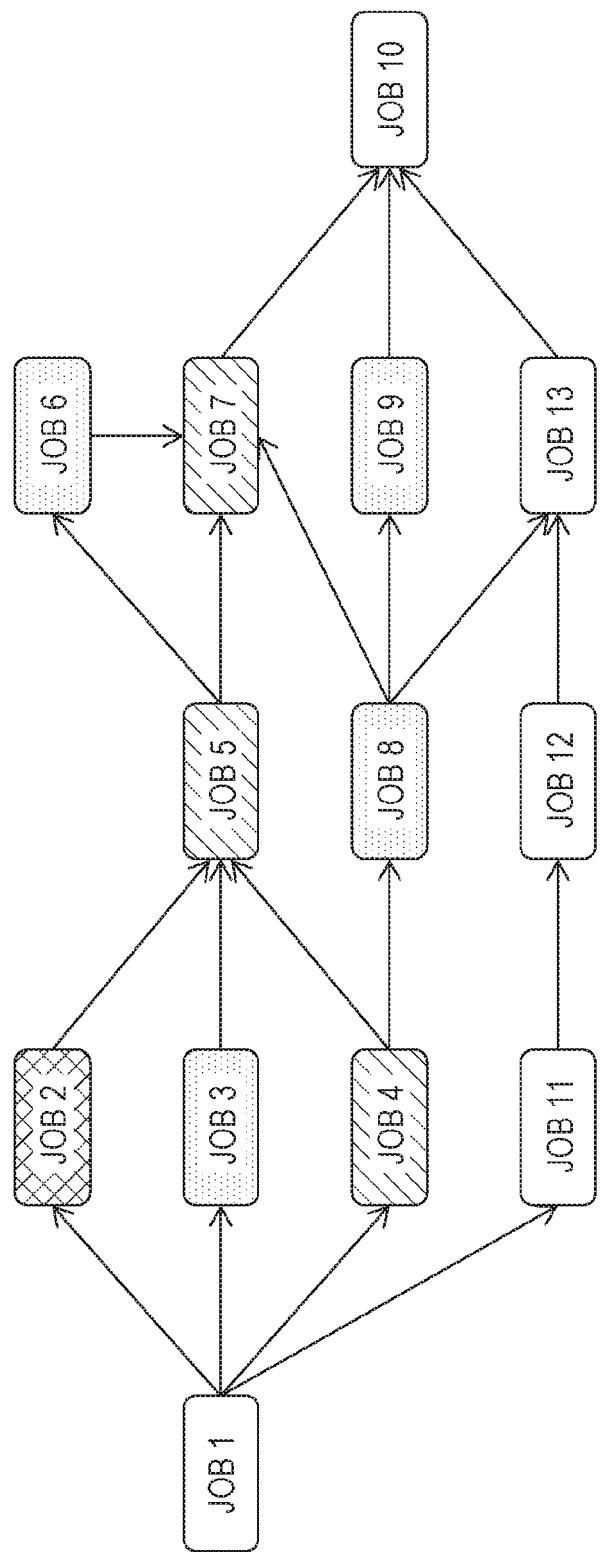
FIG. 6 a diagram illustrating an example of relationships between each job and job classification information, according to an embodiment.

FIG. 6 illustrates relationships between each job and the job classification information according to an embodiment. FIG. 6 is a job flow that clarifies job classifications included in the job flow in FIG. 5.

The following illustrates an example of grouping based on the branch and base information during the virtualization and consolidation. The original job names are job 1 to job 13 and are expressed as branch information to facilitate understanding in FIG. 6 and hereinbelow.

The inter-job relationship information 15 and the job classification information 16 are obtained as described above. The computer 12 facilitates monitoring by implementing the grouping and displaying the grouping with the following method, based on the inter-job relationship information 15 and the job classification information 16.

(1) First, the computer 12 groups the jobs connected by having the same classification information into one group, based on the job classification table 16-1 created in S7 and the inter-job relationship information 15, and creates a group/job relation table as depicted in FIG. 7.

Figure 8:
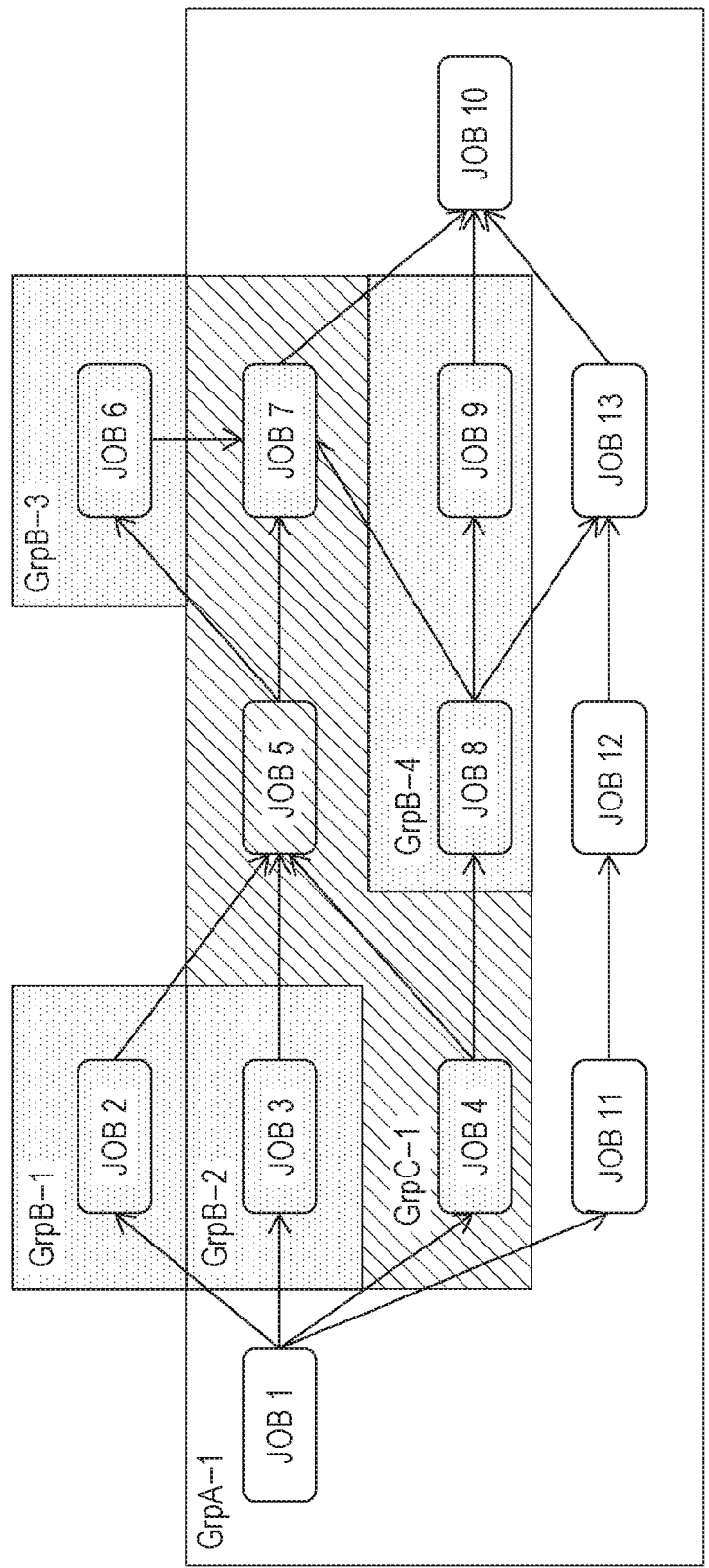
FIG. 8 is a diagram illustrating an example of a job flow of grouped jobs in intervals in which jobs with the same classification information are connected, according to an embodiment.

At this time, when there are branching jobs and even one of the jobs in the branch destination has the same classification information, the branching jobs are put into the same group. When all the subsequent jobs have different classification information, the subsequent jobs are put into separate job groups, respectively. FIG. 8 illustrates a job flow of grouped jobs in intervals in which jobs with the same classification information are connected.

Figure 10:
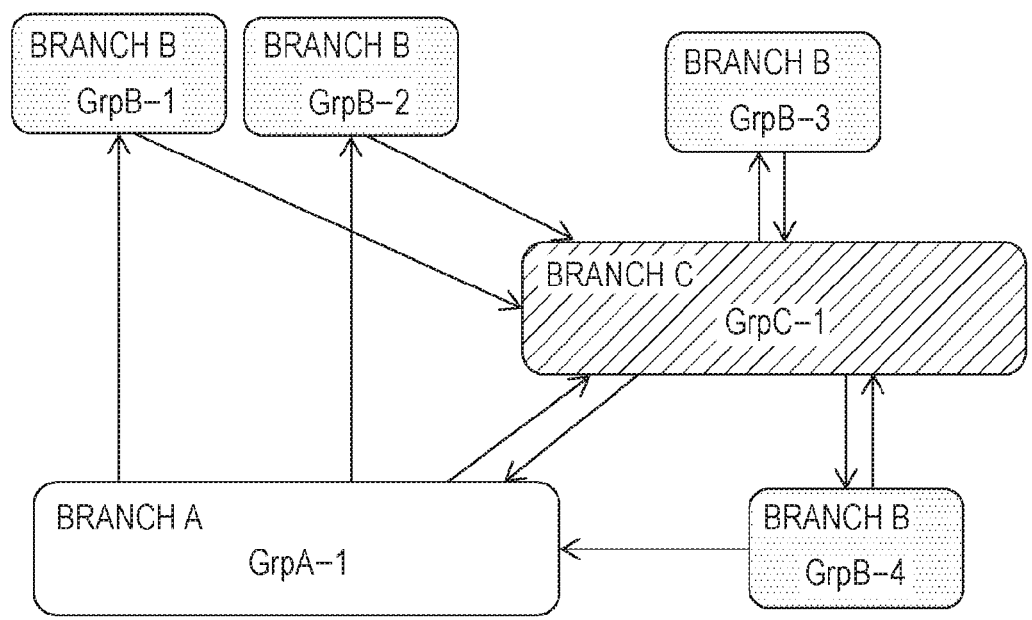
FIG. 10 is a diagram illustrating an example of relationships between groups, according to an embodiment.

(2) Next, the computer 12 creates a subsequent group management table that lists the connection relationships between groups in a table format as illustrated in FIG. 9, based on the group/job relation table created above in step (1) and the connection relations of the jobs. FIG. 10 illustrates relationships between groups according to an embodiment.

The jobs may be grouped and displayed based on the relations between the groups as depicted in FIG. 10. However, the processing sequence is difficult to understand based only on the relationship diagram depicted in FIG. 10. Accordingly, the following procedures are implemented and the currently running jobs may be visualized to indicate where the jobs are positioned within the overall flow.

(3) The computer 12 finds a distance (number of arrows) from the first job (job executed first in the job flow) to each job. There may be a plurality of distances from the first job when there are a plurality of first jobs or when there is branching or bundling. In this case, the greatest distance is used as the distance to the job in question. FIG. 11 illustrates a distance management table for managing a distance from the first job to each job.

Figure 12:
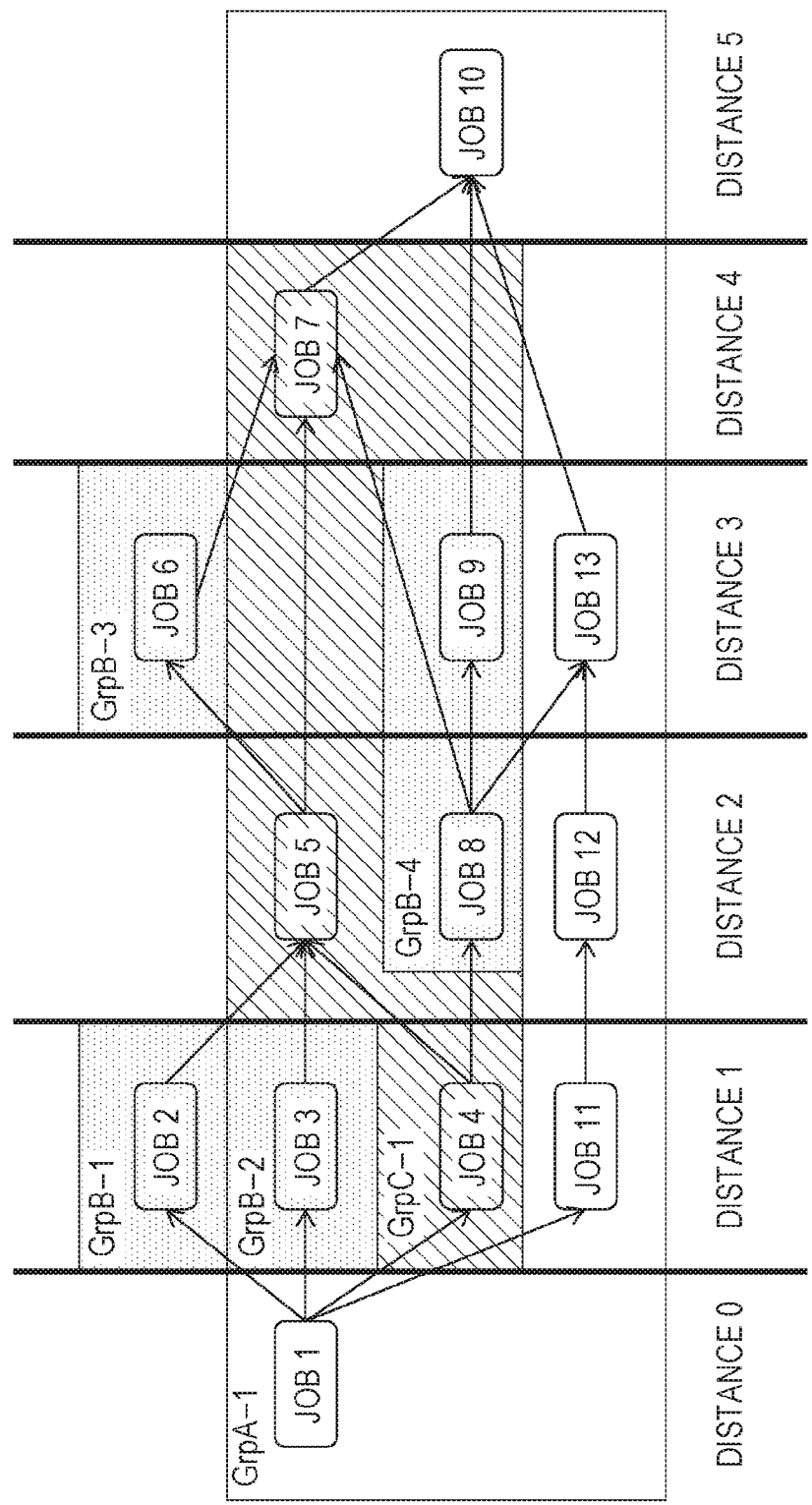
FIG. 12 is a diagram illustrating an example of relationships between job flows and distances of jobs, according to an embodiment.

Furthermore, an example of the relationship between the job flow and a distance for each job is illustrated in FIG. 12. FIG. 12 is a depiction of the job flow diagram in FIG. 8 which is partitioned according to the distances from the first job based on the distance management table in FIG. 11.

(4) Next, the computer 12 determines the execution intervals in each group based on the subsequent group management table (FIG. 9) and the distance management table (FIG. 11), and lists them as a table. Specifically, the computer 12 finds the smallest distance and the greatest distance among the jobs included in the groups. The range of the smallest distance to the greatest distance is the group execution interval.

Figure 14:
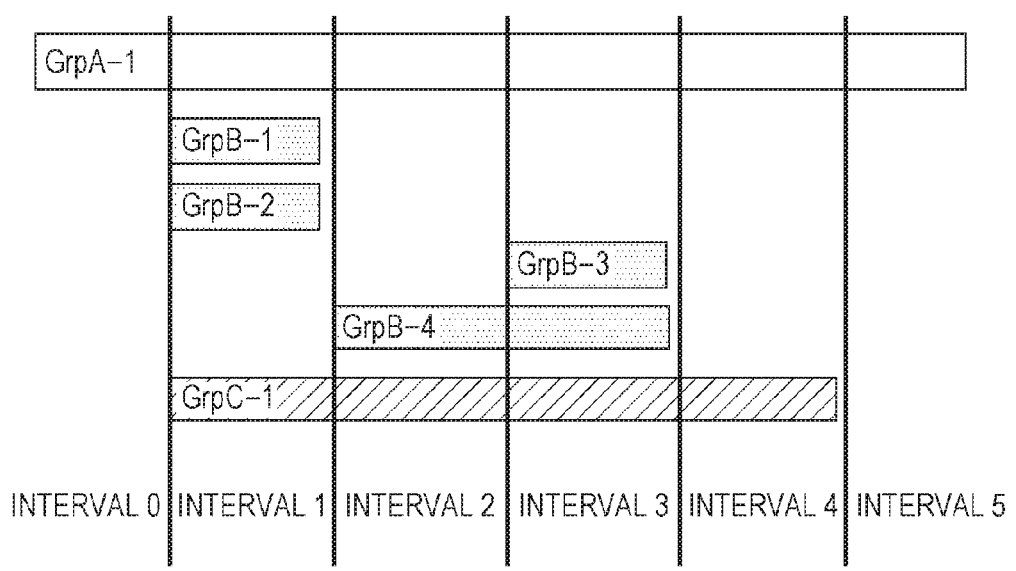
FIG. 14 is a diagram illustrating an example of relationships between groups and intervals, according to an embodiment.

Further, the computer 12 calculates connecting intervals to the subsequent group of each group from the job connection relationships (FIG. 9) and the distance management table which indicates the distance from the first job to each job (FIG. 11). The computer 12 creates an execution interval management table, as illustrated in FIG. 13, in which the calculated intervals are added to the subsequent group management table. FIG. 14 is an example of relationships between groups and intervals.

(5) A group having the same job classifications is displayed in one horizontal axis. That is, when multiple groups having the same job classification are present in the same interval, the groups are combined as one group and displayed. For example, since GrpB-1 and GrpB-2 the groups corresponding to branch B are present in interval 1, GrpB-1 and GrpB-2 are combined and displayed as GrpB in interval 1.

Figure 15:
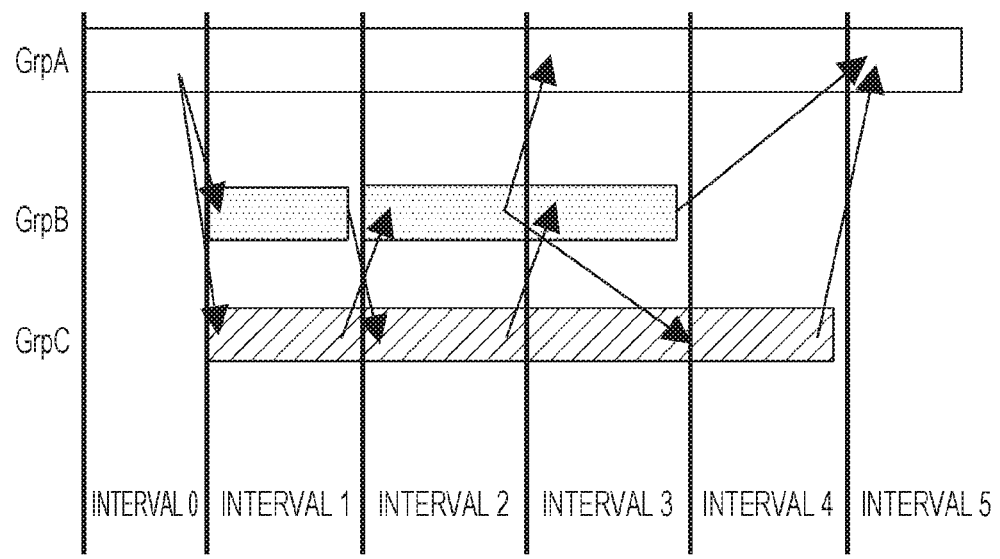
FIG. 15 is a diagram illustrating an example of groups for each job classification and relationships between groups, according to an embodiment.

FIG. 15 is an example of groups for respective job classifications and relationships between the groups. After the groups having the same job classification and present in the same interval are combined, the relationships between the groups are depicted with arrows, as illustrated in FIG. 15, by using the execution interval management table (FIG. 13).

That is, when an antecedent job and the job subsequent thereto among connected jobs belong to different groups, the transition information thereof is illustrated by an arrow.

Figure 16:
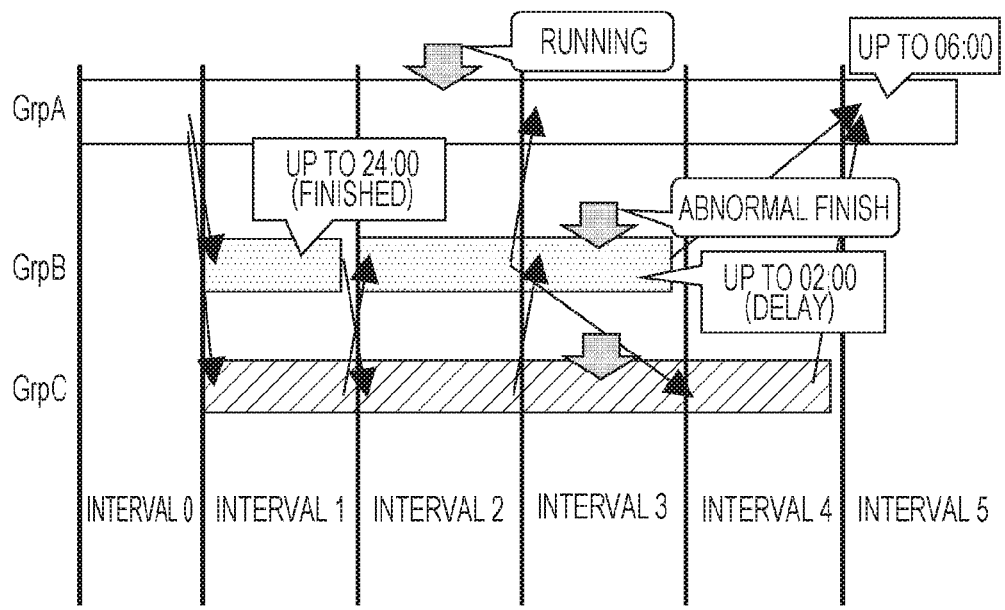
FIG. 16 is a diagram illustrating an example of group monitoring, according to an embodiment.

(6) FIG. 16 illustrates a group monitoring diagram according to an embodiment. The group monitoring diagram is displayed on a screen of a monitor as illustrated in FIG. 16 during monitoring. The group monitoring diagram displays the grouped attribute information in the vertical axis and time in the horizontal axis, and displays bars each depicting the execution time period of a job as a Gantt chart partitioned into prescribed time period intervals. The current execution position in each group is displayed with an arrow or the like from the interval positions of the currently running job and the job within each group.

By moving the thick arrows from the interval 0 to the right according to the execution of the job, it is easy to understand the current execution location with respect to the entire job flow. The states of the jobs within the groups may be displayed in an easy to understand manner by changing the color and the like of the thick arrows according to the execution conditions of the jobs in each group.

When there are a large number of groups, the display of arrows indicating the relationships between the groups increases and the relationships become difficult to understand. As a result, when a specific group is designated, the relationships may be displayed in a manner that is easy to understand by displaying only the arrows that indicate the antecedent and subsequent relationships related to that group.

Moreover, when a closing time is present for a job within each group in a certain interval, the closing time may be displayed. The completion or delay of an execution may be displayed with the closing time.

(7) When there is a job flow with a large amount of jobs, the number of intervals may become too great and the group monitoring diagram described above in step (6) may not be contained within the screen. In this case, the computer 12 displays the group monitoring diagram by reducing the width automatically or by reducing the width to an optional size so that the group monitoring diagram fits in the screen.

Figure 17:
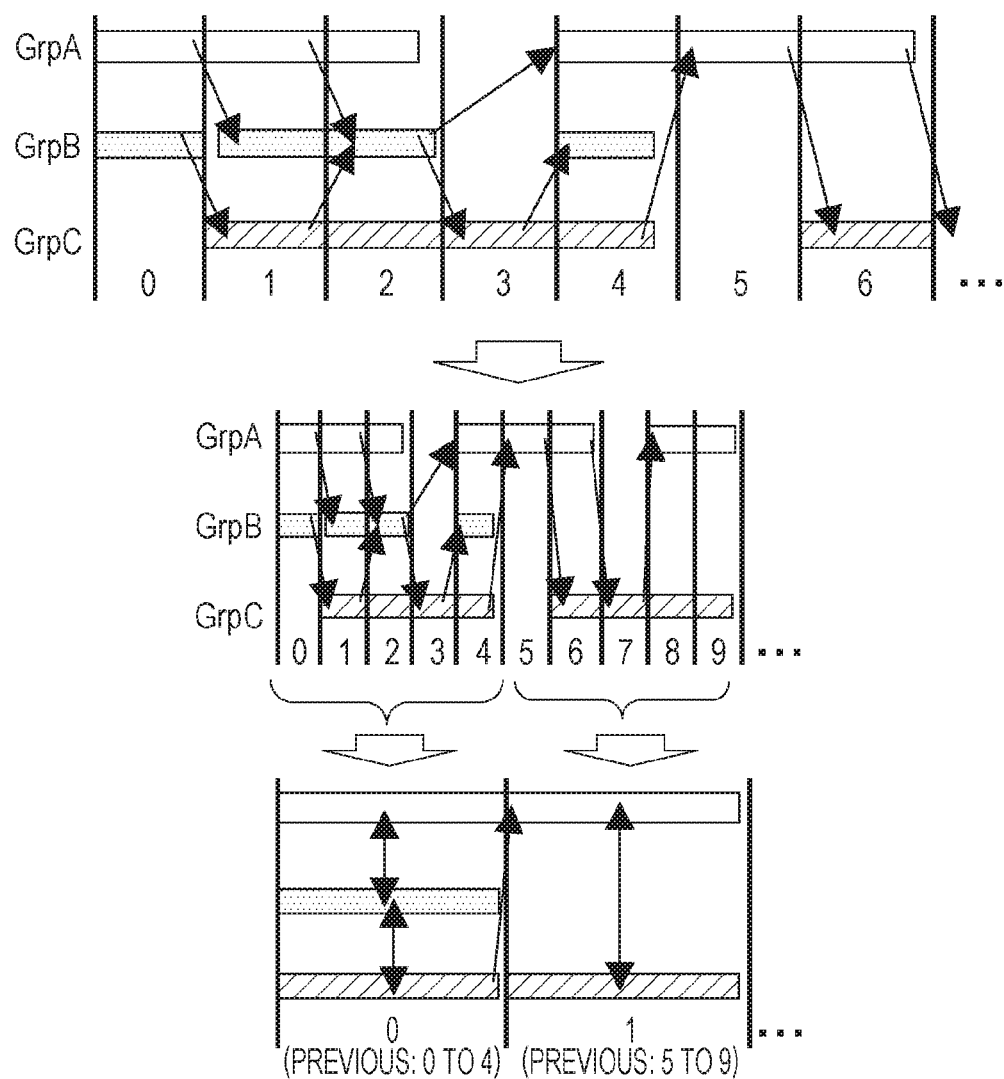
FIG. 17 is a diagram illustrating an example of group monitoring that combines and displays a plurality of intervals, according to an embodiment.

However, the width of one interval may become too small and become difficult to read by simply reducing the width. As a result, the computer 12 reduces and displays the group monitoring diagram by combining a plurality of intervals as illustrated in FIG. 17.

When combining a plurality of intervals and there are a plurality of arrows indicating relationships between groups in each interval, the number of arrows per one interval increases and the diagram becomes difficult to read when the entire diagram is displayed in the same way.

Accordingly, the arrows between intervals are combined according to the following concept. The following steps (A) to (D) are implemented on the top diagram in FIG. 17 to arrive at the bottom diagram in FIG. 17.

(A) When the size of the group monitoring diagram is automatically changed, the computer 12 calculates the desired screen size for displaying the diagram from the relationship with the current screen size, without reducing all of the monitoring diagrams. In the case of designating an arbitrary size, the operator designates the level of reduction.

(B) The computer 12 calculates a combined interval number I in one interval from the reciprocal of the level of reduction. In the example in FIG. 17, since because the level of reduction is 20%, five intervals are newly combined in one interval based on 1/0.2. Here, the combined interval number I=5 intervals.

(C) The computer 12 obtain a new interval N and the correspondence relation between the arrows indicating the relationships between groups in each of the pre-reduction intervals "N×I to (N+1)×I−1". In the example in FIG. 17, the new interval 1 corresponds to the pre-reduction intervals 5 to 9 because the number I, indicating the number of intervals to be combined, is 5. Next, the correspondence relationship may be obtained indicating how the pre-reduction arrows are changed to the arrows from one interval to another interval in the new interval. The relationships between groups and connecting interval information before and after the reduction are saved in a reduction display management table as illustrated in FIG. 18.

(D) The computer 12 combines, as one arrow, the information of the arrows having the same relationships between groups within an interval in the new interval, from the relation information between groups in the new interval saved in the reduction display management table (FIG. 18). With reference to the "post-reduction arrow ID" field in the reduction display management table (FIG. 18), when there are a plurality of arrows, for example, from interval 0 for GrpA to interval 0 for GrpB, the computer 12 displays the plurality of arrows as one arrow.

The computer 12 combines arrows in opposite directions in the reduction display management table into one bi-directional arrow (refer to "bi-directional determination flag" field in the reduction display management table). For example, when an arrow from interval 0 for GrpA to interval 0 for GrpB and an arrow from interval 0 for GrpB to interval 0 for GrpA are present in the new interval, the directions of the two arrows are in opposite directions. In this case, the computer 12 displays the arrows as one bi-directional arrow instead of as two arrows in each direction.

As a result, the relationships between groups may still be displayed even though the number of arrows is reduced.

The computer 12 is able to display the execution conditions or the closing times of each group as indicated above in step (6) after implementing steps (A) to (D) and displaying the groups in a reduced display state. As a result, the conditions of each group can be monitored in the same way even in the reduced display state.

According to the embodiment, the groups are displayed based on the distances from the first job and the execution intervals of the groups. The display size is changed automatically in response to the screen size in a format that enables understanding of the relationships between the groups. The execution conditions of the entire job flow may be easily understood, and monitoring and managing may be carried out comprehensively even in an environment with a large number of jobs.

Moreover, monitoring and management may be facilitated because the meanings of the tasks are displayed in a format easy to understand, by grouping jobs based on branch and base information before consolidating the jobs and the job classification information during operation.

By carrying out the above grouping automatically, the task load during job consolidation may be limited during the server virtualization and consolidation.

The following is a detailed explanation of the embodiment.

[Batch Transfer Processing]

Figure 19:
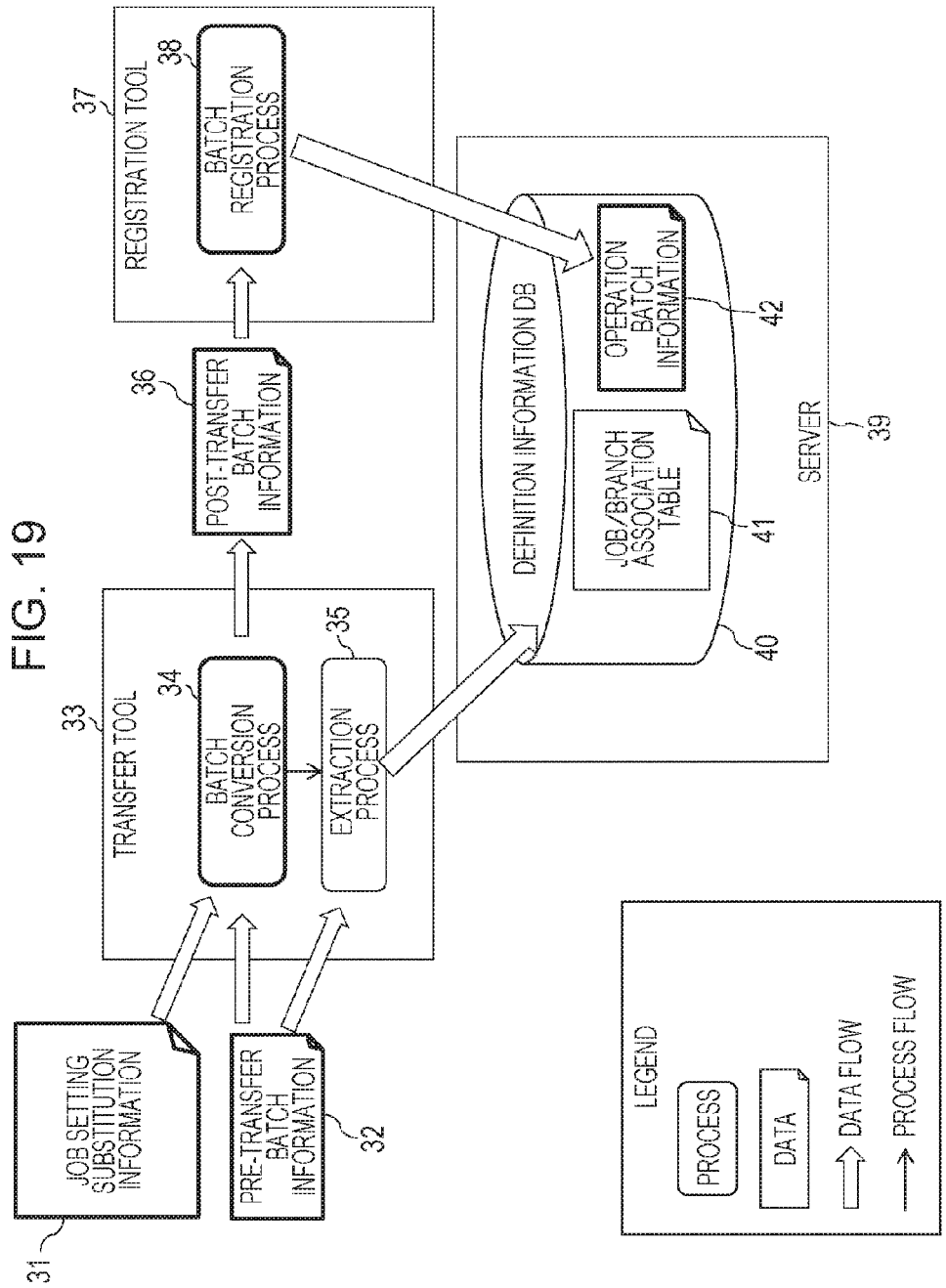
FIG. 19 is a diagram illustrating an example of a system configuration for batch transfer processing, according to an embodiment.

FIG. 19 illustrates a system configuration for batch transfer processing according to an embodiment. The processing illustrated in FIG. 19 is carried out when transferring the batch information collected from each branch and base to a post-virtualization and consolidation environment.

It is assumed that pre-transfer batch information 32 is consolidated by a predetermined tool and the like from the branches or bases before the virtualization and consolidation.

Job setting substitution information 31 is used when automatically substituting the job setting information to the environment after the transfer, and includes information on a target to be substituted and information on what is substituted for the target. For example, "job execution server information" is included in the job settings. Information which indicates that the execution server information A before the transfer is substituted with execution server information B after the transfer is included in the job setting substitution information 31. The job setting substitution information 31 is created beforehand.

A transfer tool 33 is a tool for transferring the batch information and the job information before the virtualization and consolidation to the system in the data center, and is executed by a computer based an operation by an operator. The transfer tool 33 executes a batch conversion process 34 and an extraction process 35.

The batch conversion process 34 involves converting the batch information 32 before the virtualization and consolidation so as to be used in the environment after the virtualization and consolidation. For example, when a batch management product is different before and after the consolidation or when the version of a product is different before and after the consolidation, the batch conversion process 34 carries out the following processing to ensure that the batch management product is able to be used in the post-consolidation environment. That is, the batch conversion process 34 creates post-transfer batch information 36 by converting the batch information (pre-transfer batch information) 32.

Moreover, the batch conversion process 34 uses the job setting substitution information 31 to substitute information that desires setting changes before and after the transfer, among the job setting information, and to set parameters conforming to the post-transfer environment.

The extraction process 35 includes extracting, from the pre-transfer batch information 32, information indicating in which branch or base each job has been executed. That is, the extraction process 35 includes extracting information indicating in which branch or base each job has been executed, which is desired for displaying the groupings of the job flow. The extraction process 35 includes creating a job/branch correspondence table 41 from the extracted correspondence relations between the jobs and the branches and storing the job/branch correspondence table 41 in a definition information database (DB) 40 in a server 39.

A registration tool 37 registers the post-transfer batch information 36 as operation batch information 42 in the definition information DB 40 in the server 39.

FIG. 20 illustrates a job/branch correspondence information temporary table according to an embodiment. The job/branch correspondence information temporary table 51 is a temporary table used in the extraction process 35 for extracting information about the branches or bases where a job has been executed. The job/branch correspondence information temporary table 51 includes data fields for a "job number", "subnet information", an "abnormality notification address", and a "branch/base number".

FIG. 21 illustrates a job/branch correspondence table according to an embodiment. A job/branch correspondence table 41 includes data fields for the "branch/base number" and the "job number".

Figure 22:
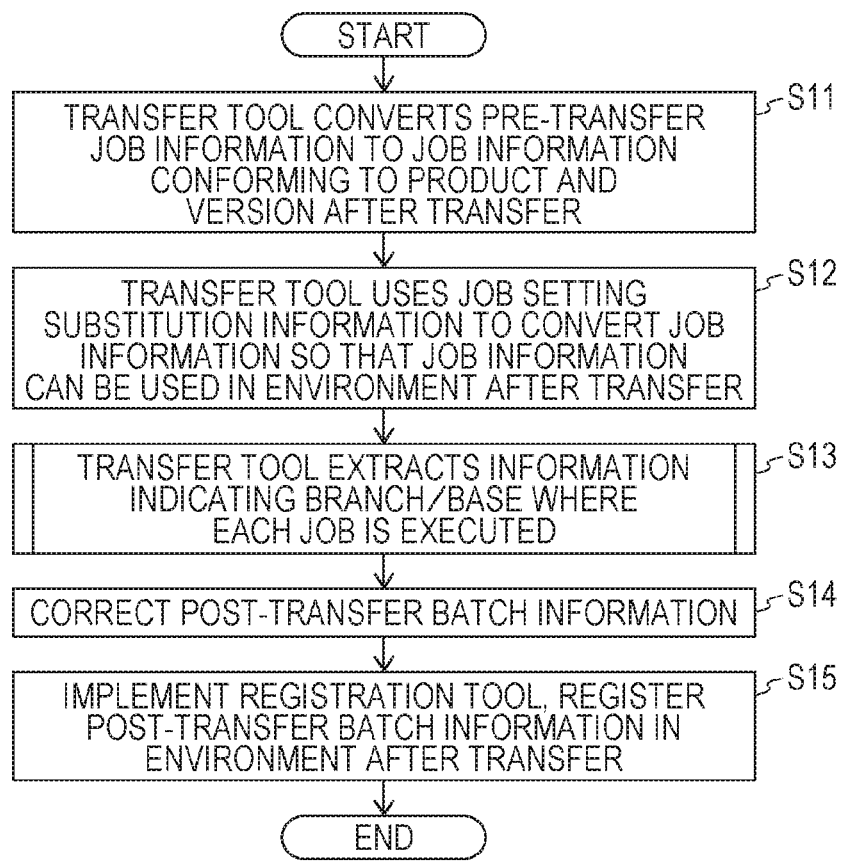
FIG. 22 is a diagram illustrating an example of an overall operational flowchart for batch transfer processing, according to an embodiment.

FIG. 22 illustrates an overall flow of batch transfer processing according to an embodiment. The following processing is implemented in the batch transfer process.

The transfer tool 33 converts the pre-transfer batch information 32 and the information of each job to job information conforming to the products and versions in the post-transfer environment (S11).

The transfer tool 33 uses the job setting substitution information 31 to convert the job information converted in S11 to job information that can be used in the environment after the transfer (S12). When the job setting substitution information 31 is present, the transfer tool 33 carries out the following processing. That is, when setting information to be substituted according to the job setting substitution information 31 is present in the job information converted in S11 by the transfer tool 33, the transfer tool 33 substitutes the job setting information in the job information converted in S11 to create the post-transfer batch information 36. The transfer tool 33 outputs the created post-transfer batch information 36.

The transfer tool 33 carries out the extraction process 35 which includes extracting information indicating branch or base where each job has been executed from the pre-transfer batch information 32, and registers the extracted information in the definition information DB 40 in the server 39 for the job management products (S13). The processing in S13 is described in detail in FIG. 23.

The operator implements correction when desired on the post-transfer batch information 36 (S14). The correction is implemented manually or by using another tool.

The operator uses the registration tool 37 to register the post-transfer batch information 36 in the definition information DB 40 in the server 39 for the job management products (S15).

Figure 23:
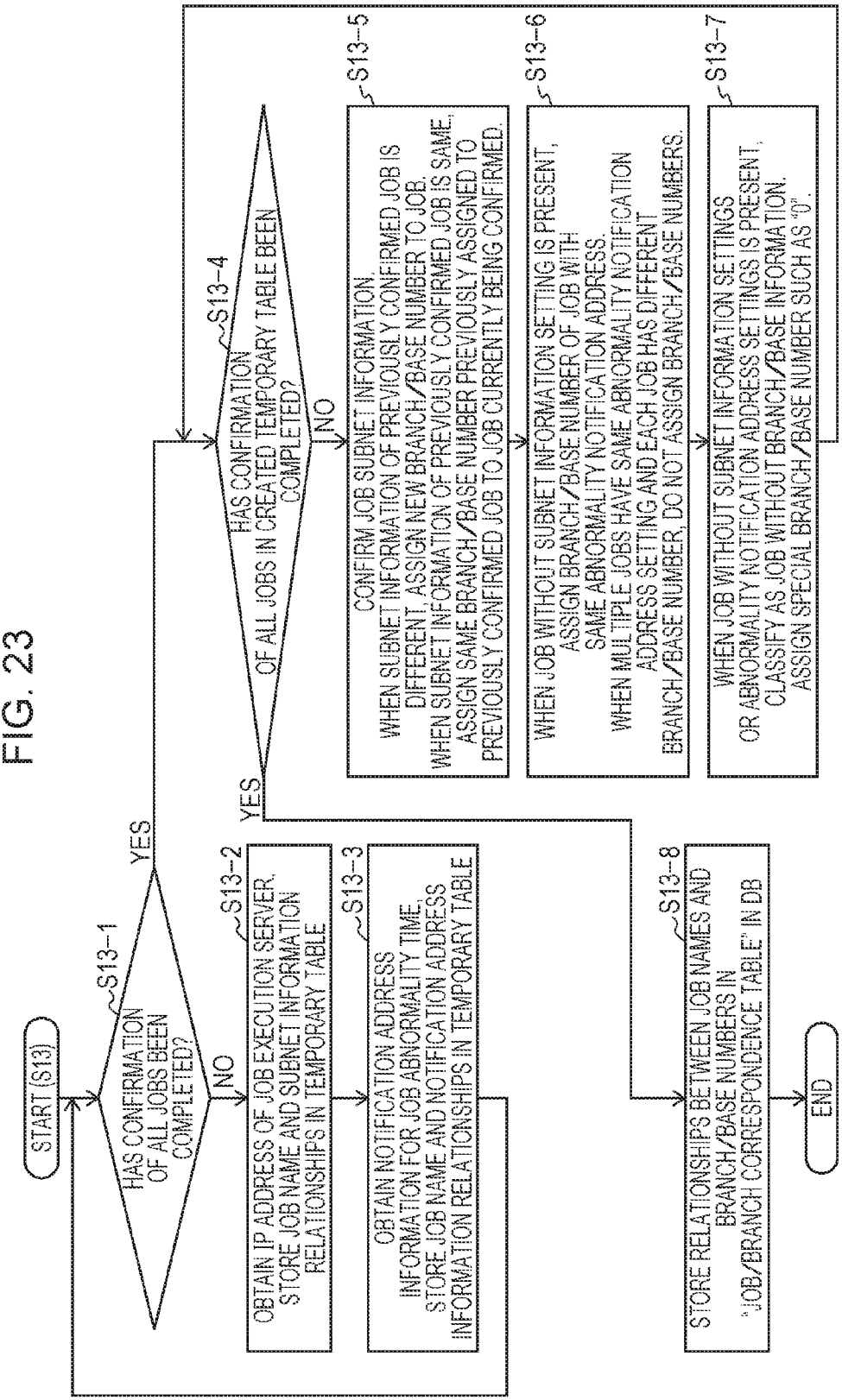
FIG. 23 is a diagram illustrating an example of an operational flowchart of an extraction process for extracting information of branches or bases where jobs are executed, according to an embodiment.

FIG. 23 illustrates a flow of an extraction process (S13) for extracting information of branches or bases where jobs have been executed, according to an embodiment.

The transfer tool 33 obtains the IP address of the job execution server from the pre-transfer batch information 32 and extracts the subnet information from the IP address. The transfer tool 33 stores relationships between the job name (job number) and subnet information, in the job/branch correspondence information temporary table 51 (S13-2).

The transfer tool 33 obtains notification address information for notifying when a job abnormality occurs, from the pre-transfer batch information 32. The transfer tool 33 stores relationships between the job name (job number) and the notification address information, in the job/branch correspondence information temporary table 51 (S13-3).

The transfer tool 33 repeats the processing from S13-2 to S13-3 for all the jobs in the pre-transfer batch information 32.

After carrying out the processing from S13-2 to S13-3 for all the jobs in the pre-transfer batch information 32, the transfer tool 33 confirms the subnet information of the jobs stored in the job/branch correspondence information temporary table 51. When the confirmed job subnet information differs from the previously confirmed job subnet information, the transfer tool 33 assigns a new branch/base number to that job and registers the new branch/base number in the job/branch correspondence information temporary table 51.

Furthermore, the transfer tool 33 carries out the next processing when the confirmed job subnet information is the same as the previously confirmed job subnet information. That is, the transfer tool 33 assigns the branch/base number that is the same as the branch/base number assigned to the previously confirmed job, to the job currently being confirmed and registers the branch/base number in the job/branch correspondence information temporary table 51 (S13-5).

When a job does not have set subnet information, the transfer tool 33 assigns a branch/base number of a job having the same abnormality notification address and registers the branch/base number in the job/branch correspondence information temporary table 51. However, when a plurality of jobs set with the same abnormality notification address are present but each have different branch/base numbers, the transfer tool 33 does not assign a branch/base number (S13-6).

When a job does not have the subnet information nor the abnormality notification address setting, the transfer tool 33 classifies the job as a job without branch/base information (S13-7). As a result, a special branch/base number, such as "0", is assigned and registered in the job/branch correspondence information temporary table 51.

The transfer tool 33 repeats the processing from S13-5 to S13-7 for all the jobs in the created temporary table 51. After completing the processing from S13-5 to S13-7 for all the jobs in the created temporary table 51, the transfer tool 33 carries out the following processing. That is, the transfer tool 33 stores the relationships between the job names and the branch/base numbers stored in the job/branch correspondence information temporary table 51 in the job/branch correspondence table 41 in the definition information DB 40 (S13-8).

[Job Flow Grouping Display Processing]

Figure 24:
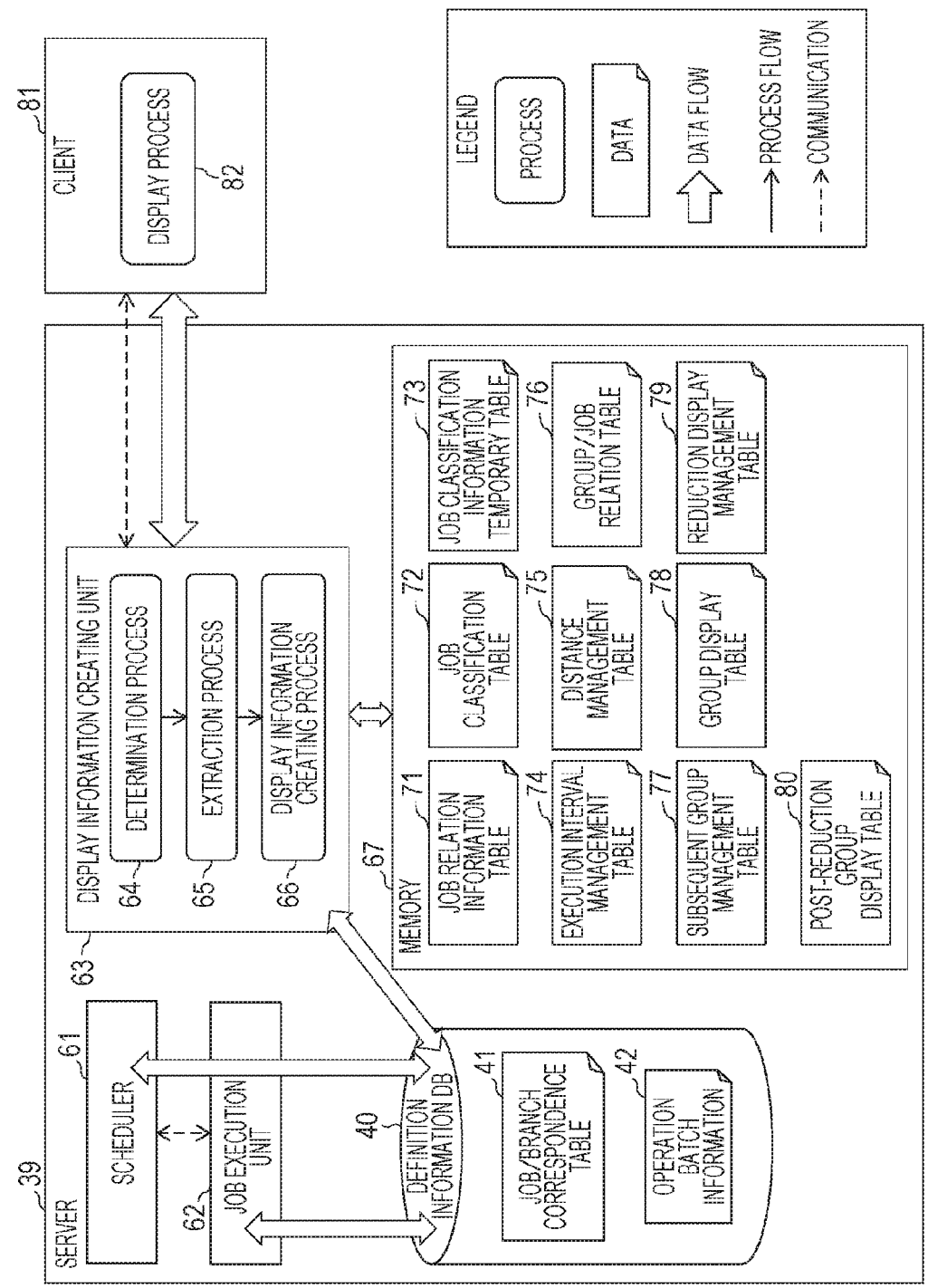
FIG. 24 is a diagram illustrating an example of a system configuration for grouping display processing for a job flow, according to an embodiment.

FIG. 24 illustrates a system configuration for grouping display processing for a job flow according to an embodiment. The processing illustrated in FIG. 24 is carried out when implementing the grouping display of job flows while using the batch information in the post-virtualization and consolidation environment or the operation environment.

The system in FIG. 24 includes the server 39 and a client device (referred to below as "client") 81.

The server 39 includes a scheduler 61, a job execution unit 62, the definition information DB 40, a display information creating unit 63, and a memory 67. The scheduler 61, the job execution unit 62, and the display information creating unit 63 are executed by a processor such as a central processing unit (CPU). The definition information DB 40 is stored in a storage device.

The scheduler 61 manages schedules for executing the jobs. The job execution unit 62 executes the jobs managed by the scheduler 61 based on schedule information.

The definition information DB 40 stores the job/branch correspondence table 41 and the operation batch information 42 obtained in the abovementioned batch transfer processing.

The display information creating unit 63 creates information corresponding to requests from the client 81 and issues replies to the client 81. The display information creating unit 63 executes a determination process 64, the extraction process 65, and the display information creating process 66.

The determination process 64 includes determining relation information between jobs. That is, the determination process 64 includes extracting the relation information between jobs from the operation batch information 42 and summarizing the relation information between jobs so that the relation information is displayed in the job flow format. The display information creating unit 63 stores relation information between jobs as the job relation information table 71, and uses the relation information between jobs when grouping and displaying the job flow.

The extraction process 65 includes extracting the job classification information. That is, the extraction process 65 includes carrying out the following processing when the job/branch correspondence table 41 is not created during the batch transfer process and the like or when a grouping method is designated. The extraction process 65 classifies each job based on the operation batch information 42 and creates a job classification table 72.

The display information creating process 66 includes creating display information according to the job groupings based on the job classification information. That is, the display information creating process 66 includes using the job relation information table 71 and the job classification table 72 to create information for grouping and displaying the job flow.

The memory 67 holds the job relation information table 71 and the job classification table 72. Furthermore, the memory 67 holds a job classification information temporary table 73, an execution interval management table 74, a distance management table 75, a group/job relation table 76, a subsequent group management table 77, a group display table 78, and a reduction display management table 79.

The client 81 receives, from the server 39, information of the job flow to be displayed within the post-correction batch information and job grouping information. Then, the client 81 executes a display process 82 for grouping and displaying the job flow on a screen.

FIG. 25 illustrates the job relation information table 71 according to an embodiment. The job relation information table 71 is a table for managing the relation information between jobs. The job relation information table 71 includes data fields for a "job number", a "job name", and a "subsequent job number".

Job numbers for identifying jobs are stored under the "job number". Job names corresponding to each job number are stored under the "job name". Job numbers of jobs executed after the job represented by the job number stored under the "job number" data field are stored under the "subsequent job number".

FIG. 26 illustrates the job classification table 72 according to an embodiment. The job classification table 72 is a correspondence table for each job and the job classification information. The job classification table 72 includes "job classification information" and "job number" data fields.

Information about the type for classifying the job (e.g., the branch/base number) is stored under the "job classification information". The job number corresponding to the information stored under the "job classification information" data field is stored under the "job number".

FIG. 27 illustrates the job classification information temporary table 73 according to an embodiment. The job classification information temporary table 73 is a temporary table for job classification information. The job classification information temporary table 73 includes data fields for a "job number", a "character string token", "scheduled activation date information", and the "job classification information".

Job numbers are stored under the "job number". Words (character string tokens) are stored under "character string token". The scheduled activation dates of a job represented by the job number are stored under "scheduled activation date information". Information about the type for classifying the job (e.g., the branch/base number) is stored under the "job classification information".

FIG. 28 illustrates the execution interval management table 74 according to an embodiment. The execution interval management table 74 is a table for managing groups, jobs within groups, subsequent groups, and execution intervals. The execution interval management table 74 includes data fields for a "group number", a "job number", a "job classification", an "execution interval", a "subsequent group number", and a "connecting interval".

Numbers for specifying groups which are groupings of jobs are stored under the "group number". Job numbers of grouped jobs are stored under the "job number". The job classification information is stored under the "job classification information". The intervals for executing the grouped jobs are stored under the "execution interval". The group numbers of subsequent groups in the execution interval are stored under the "subsequent group number". Connection information to the "subsequent group number" (connection target) is stored under the "connecting interval".

Figure 29:
FIG. 29 is a diagram illustrating an example of a distance management table, according to an embodiment.

FIG. 29 illustrates the distance management table 75 according to an embodiment. The distance management table 75 is a table for managing a distance from the first job to each job. The distance management table 75 includes data fields for a "job number" and a "distance".

Job numbers are stored under the "job number". The distance of each job from the first job is stored under "distance".

FIG. 30 illustrates the group/job relation table 76 according to an embodiment. The group/job relation table 76 is a table for relating groups and jobs with each other. The group/job relation table 76 includes data fields for a "group number", a "job number", and the "job classification information".

A group number for identifying each group is stored under the "group number". Job numbers are stored under the "job number". The job classification information is stored under the "job classification information".

FIG. 31 illustrates the subsequent group management table 77 according to an embodiment. The subsequent group management table 77 is a relationship table for groups, jobs, and subsequent groups. The subsequent group management table 77 includes data fields for the "group number", the "job number", the "job classification information", and the "subsequent group number".

Group numbers are stored under the "group number". Job numbers are stored under the "job number". The job classification information is stored under the "job classification information". The group numbers of subsequent groups are stored under the "subsequent group number".

FIG. 32 illustrates the group display table 78 according to an embodiment. The group display table 78 holds the contents for displaying the group monitoring diagram (FIG. 16). The group display table 78 includes the data fields of the "job classification information", the "group number", the "execution interval", "subsequent job classification information", the "connecting interval", a "display state", a "display state position", and a "closing time".

The job classification information is stored under the "job classification information". Group numbers are stored under the "group number". The execution interval in the group monitoring diagram is stored under the "execution interval". The job classification information of the subsequent job is stored under the "subsequent job classification information". The connecting information from the applicable job classification information to the subsequent job classification information in the applicable execution interval is stored under the "connecting interval". A display state (e.g., running, abnormal finish, etc.) of the applicable job classification information is stored under the "display state". Interval information for displaying the "display state" is stored under the "state display position". The closing time pertaining to the applicable job classification information is stored under the "closing time".

FIG. 33 illustrates the reduction display management table 79 (when reducing three intervals to one interval) according to an embodiment. The reduction display management table 79 is a correspondence table of the relationships between the groups before and after the reduction. The reduction display management table 79 includes the data fields of a "group", a "subsequent group", a "pre-reduction connecting interval", a "post-reduction connecting interval", a "post-reduction arrow ID", and a "bi-directional determination flag".

Group numbers are stored under the "group". The group number of the group executed after the applicable group processing is stored under the "subsequent group". The connection information for connecting from the applicable group to the subsequent group before reduction is stored under the "pre-reduction connecting interval". The connection information for connecting from the applicable group to the subsequent group after reduction is stored under the "post-reduction connecting interval". Information for identifying arrows after reduction is stored under "post-reduction arrow ID". A flag (Yes: bi-directional arrow, No: single direction arrow) for determining whether an arrow is bi-directional is stored under the "bi-directional determination flag".

FIG. 34 illustrates a post-reduction group display table (when reducing three intervals to one interval) according to an embodiment. The contents of the reduced group monitoring diagram displayed using the group display table 78 are stored as the contents of the post-reduction group display table 80. The post-reduction group display table 80 includes the data fields of the "job classification information", the "group number", the "execution interval", "subsequent job classification information", the "connecting interval", the "display state", the "display state position", and the "closing time".

Figure 35:
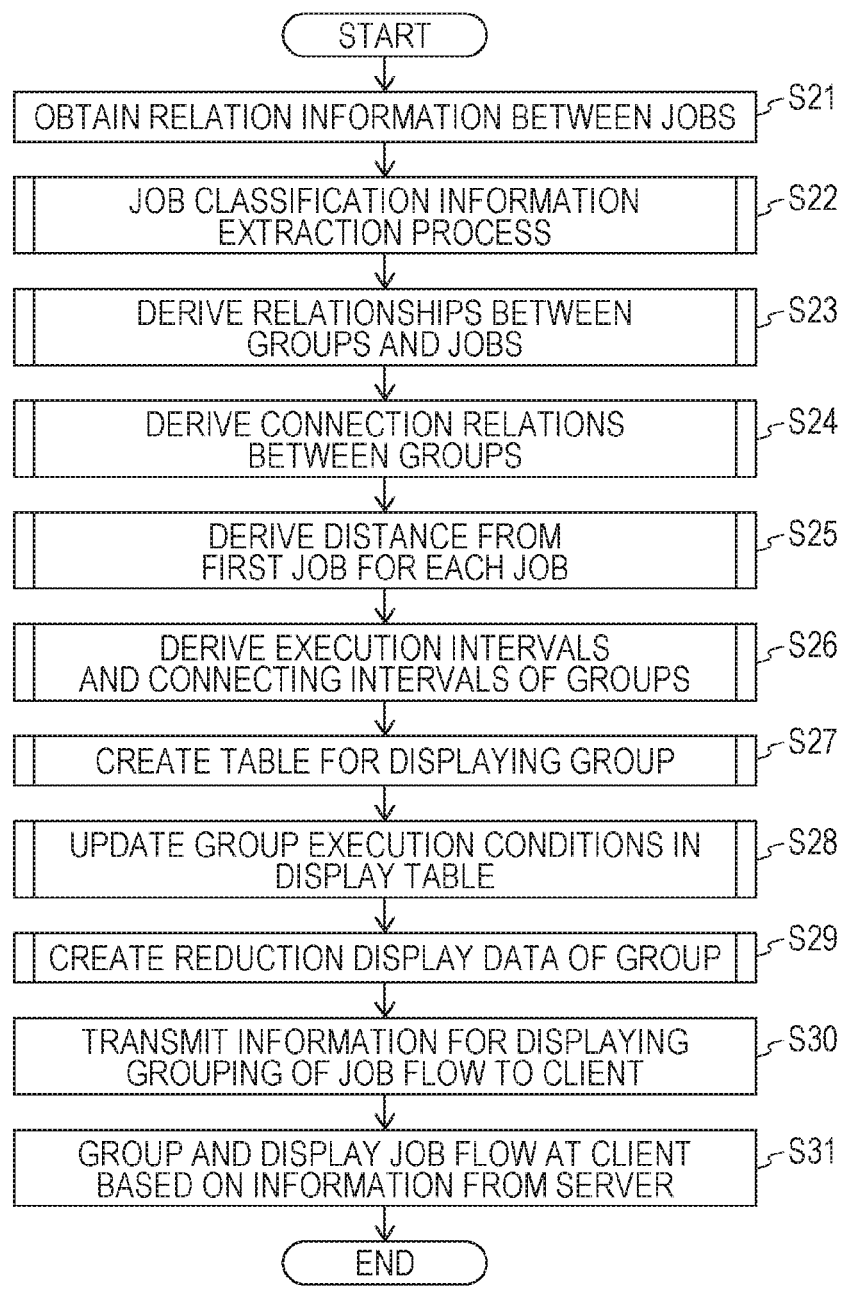
FIG. 35 is a diagram illustrating an example of an overall operational flowchart for grouping display processing for a job flow, according to an embodiment.

FIG. 35 illustrates an overall operational flowchart for grouping display processing for a job flow according to an embodiment. When a grouping display request of jobs is received from the client 81, the display information creating unit 63 implements the following processing.

The display information creating unit 63 obtains the relation information between jobs (S21). The display information creating unit 63 refers to the job information of each job in the post-consolidation batch, clarifies relationships between the jobs by checking the dependency relationships between the jobs, and stores information on the relationships in the job relation information table 71.

The display information creating unit 63 extracts the classification information of the jobs (S22). Step S22 is explained in detail with reference to FIG. 36.

Figure 36:
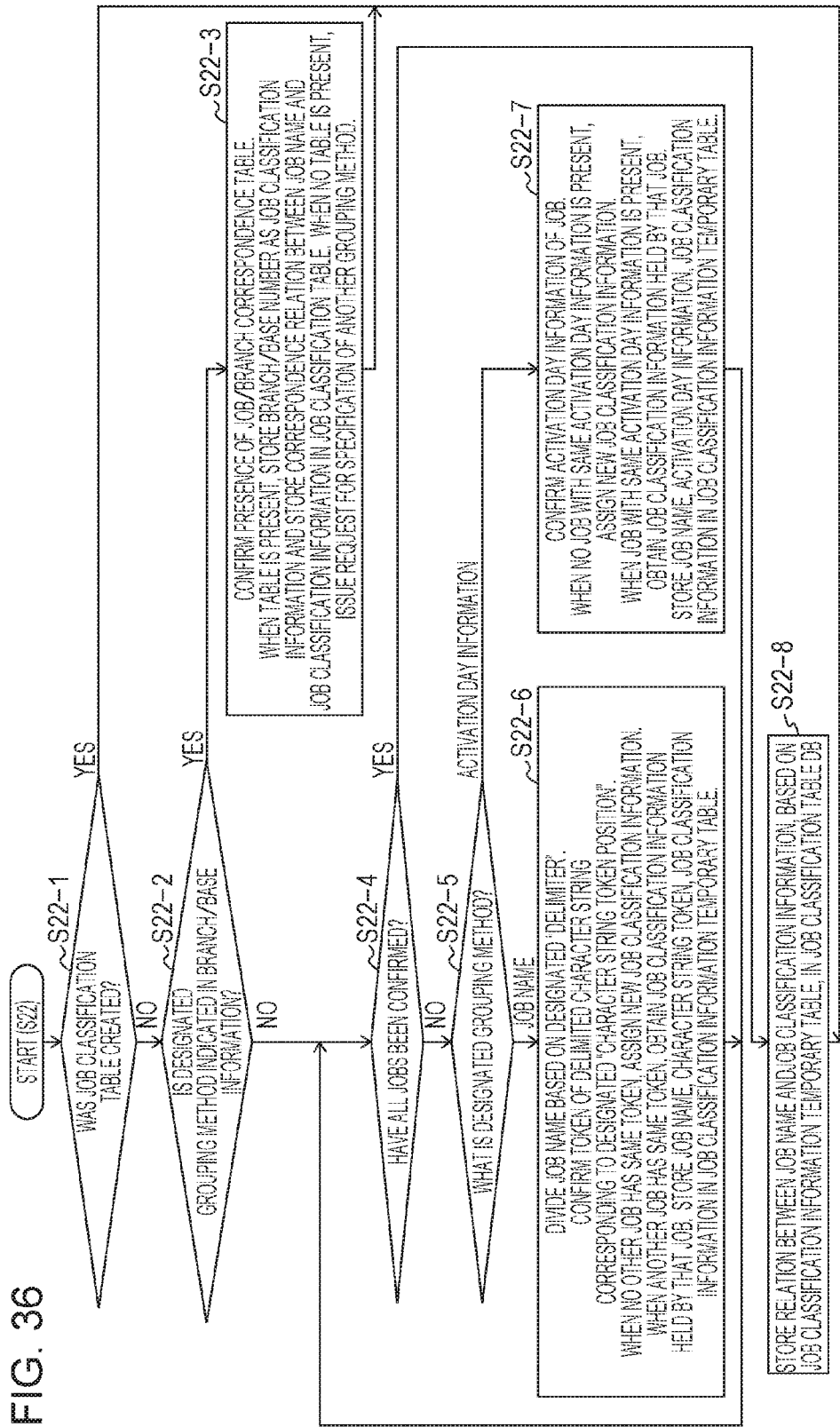
FIG. 36 is a diagram illustrating an example of an operational flowchart of an extraction process for extracting job classification information, according to an embodiment.

FIG. 36 illustrates an operational flowchart of an extraction process (S22) for extracting the job classification information according to an embodiment. When the job classification table 72 is not created during the virtualization and consolidation or by hand (S22-1: No), the display information creating unit 63 creates the job classification table 72 by extracting the classification information of the jobs using the following method.

A user may designate any of the "pre-consolidation branch/base information", the "job name", the "scheduled activation date information" as the setting for the grouping method. The display information creating unit 63 extracts the classification information with the following method based on the designated information.

In the case where the grouping using the pre-consolidation branch/base information is designated (S22-2: Yes), the display information creating unit 63 carries out the following processing when the job/branch correspondence table 41 is created during the virtualization and consolidation (S22-3). That is, the display information creating unit 63 classifies the jobs from the correspondence relationships between the jobs and the branch/base numbers in the job/branch correspondence table 41. Specifically, the display information creating unit 63 stores the correspondence relations between the jobs and the job classification information in the job classification table 72, by taking the branch/base numbers as job classification information based on the job/branch correspondence table 41.

When the job/branch correspondence table 41 is not present, the display information creating unit 63 urges the user to designate another grouping method as indicated below.

When grouping by job name is designated (S22-2: No, S22-4: No, S22-5: "job name"), the display information creating unit 63 carries out the following processing (S22-6). That is, the display information creating unit 63 requests the user to designate a "delimiter" and a "position of character string token subject to classification" and classifies the jobs by the type of character string token. The display information creating unit 63 partitions the job name according to the designated "delimiter". The display information creating unit 63 confirms the token of the delimited character string corresponding to the designated "position of character string token".

That is, the related system and the job name of the task are normally set according to specific rules. The display information creating unit 63 uses the rules to classify the jobs (e.g., a job name for an accounting system might be "Acct- Sys_ . . . process" or a job name for an order receiving system "RecSys_ . . . process").

For example, it is assumed that jobs such as "XXsystem_start process", "XXsystem_backup process", or "YYsystem_receiving process" are present. In this case, when the underscore (_) is selected as the "delimiter" and the head is selected as the "character string token position subject to classification", the jobs would be classified as "XXsystem" or "YYsystem" which is the head token in the character string delimited by the underscore.

The display information creating unit 63 assigns the same job classification information to jobs having the same token character strings in the job names, and adds the correspondence relations between the jobs and the job classification information to the job classification table 72.

When another job having the same token is not present, the display information creating unit 63 assigns new job classification information. When another job having the same token is present, the display information creating unit 63 obtains the job classification information of that job.

The display information creating unit 63 stores the job name, the character string token, and the job classification information in the job classification information temporary table 73.

When the grouping by the scheduled activation date information is designated (S22-5: "activation day information"), the display information creating unit 63 classifies the job with the scheduled activation date information set for that job (S22-7). The display information creating unit 63 confirms the activation day information of the job. When another job having the same activation day information is not present, the display information creating unit 63 assigns new job classification information. When another job having the same activation day information is present, the display information creating unit 63 obtains the job classification information of that job. The display information creating unit 63 stores the job name, the activation day information, and the job classification information in the job classification information temporary table 73.

Specifically, because the scheduled activation date information for each task is normally different, the same scheduled activation date information is set for jobs corresponding to a certain task. Scheduled activation date information for a job corresponding to a task is different from that for a job corresponding to a different task.

For example, when a job A is activated every weekday, a job B is activated every Monday, and a job C is activated every Monday, the display information creating unit 63 determines that the job B and the job C have the same classification because the scheduled activation date information of the job B and the job C is the same. In this case, the display information creating unit 63 assigns the same job classification information to the jobs having the same scheduled activation date information, and adds the correspondence relations between the jobs and the job classification information to the job classification table 72.

The display information creating unit 63 stores the relationships between the job names and the job classification information, based on the job classification information temporary table 73, in the job classification table 72 in the DB 40 (S22-8). The explanation now returns to FIG. 35.

The display information creating unit 63 derives the relationships between the groups and the jobs (S23). The display information creating unit 63 combines, as one group, a range of jobs that have the same classification information and have an antecedent/subsequent connection relationship, based on the connection relationship of the job flow in the job relation information table 71 and the correspondence relationship of the job classification information in the job classification table 72. The processing in step S23 is described with reference to FIGS. 37 and 38.

Figure 37:
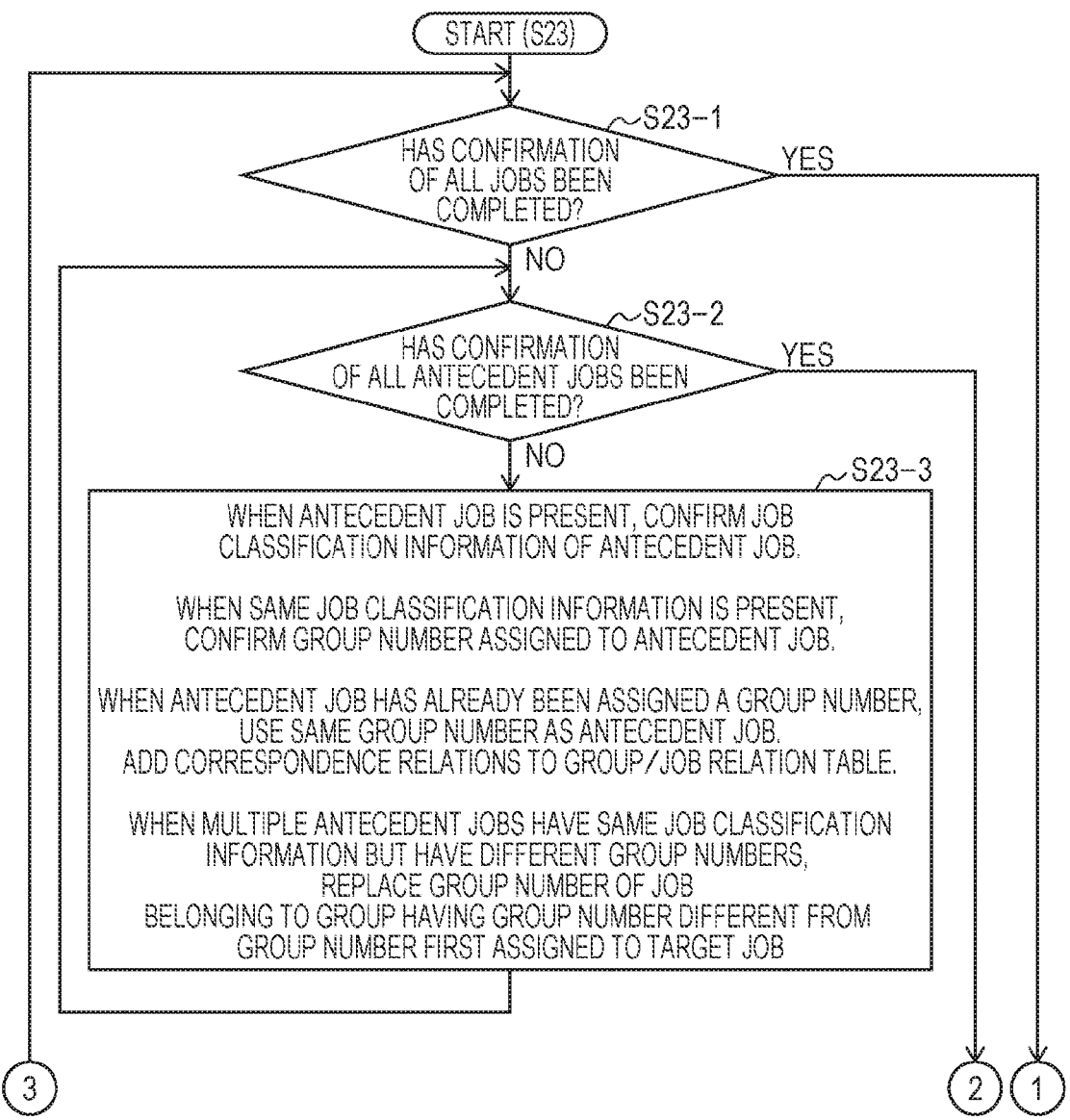
FIG. 37 is a diagram illustrating an example of an operational flowchart of a process for deriving relationships between groups and jobs, according to an embodiment.
Figure 38:
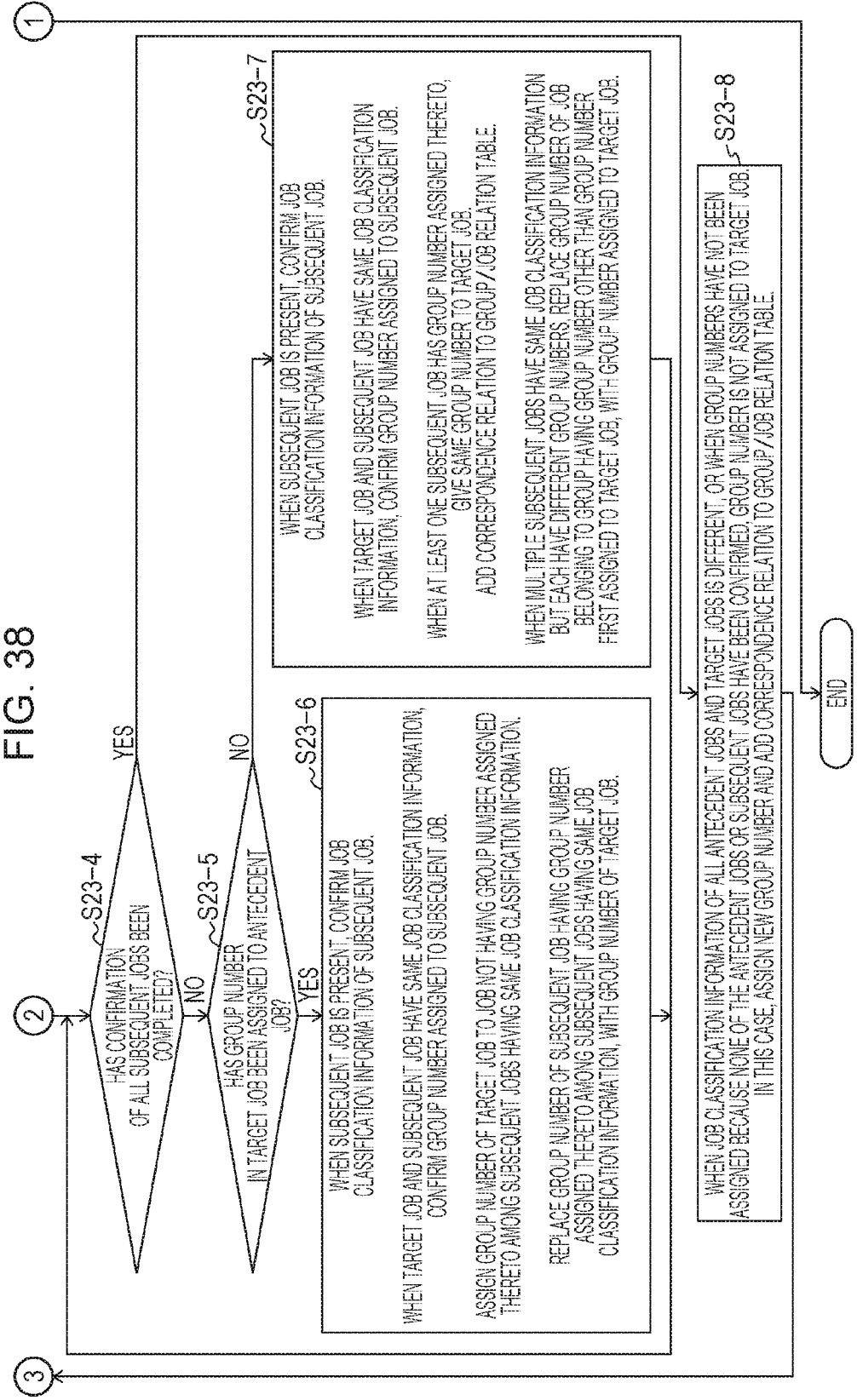
FIG. 38 is a diagram illustrating an example of an operational flowchart of a process for deriving relationships between groups and jobs, according to an embodiment.

FIGS. 37 and 38 illustrate an operational flowchart for a process (S23) of deriving relationships between group and jobs, according to an embodiment. The display information creating unit 63 determines whether the classification information of a certain job is the same as that of the job antecedent to that job. When a job has the same classification information as a job antecedent to that job, the display information creating unit 63 assigns the same group number to the jobs (S23-3).

More specifically, the display information creating unit 63 determines whether the classification information of a certain job (target job) is the same as that of a job antecedent to that job. When the job (the target job) has the same classification information as a job antecedent to that job, the display information creating unit 63 confirms the group number assigned to the antecedent job. When a group number has previously been assigned to the antecedent job, the display information creating unit 63 gives the same group number of the antecedent job to the target job. The display information creating unit 63 adds the correspondence relation between the target job and the antecedent job thereof to the group/job relation table 76.

When a plurality of antecedent jobs have the same job classification information but have different group numbers, the display information creating unit 63 replaces a group number of a job belonging to a group with a group number different from the group number first assigned to the target job, with the group number assigned to the target job.

Specifically, the display information creating unit 63 changes all the group numbers of jobs belonging to the groups corresponding to the antecedent jobs to the group number of the group of the target jobs in the group/job relation table 76, and erases the group to which the antecedent job originally belonged from the group/job relation table 76.

The processing in S23-3 is repeated until the confirmation of all the antecedent jobs is completed (S23-2: No).

Next, the display information creating unit 63 determines whether the target job and a job subsequent to the target job have the same classification information. When the target job and a job subsequent to the target job have the same classification information, the display information creating unit 63 assigns the same group number to the target job and the subsequent job.

Moreover, when there are a plurality of jobs having antecedent/subsequent relationships and each of the plurality of jobs is assigned a different group number, the display information creating unit 63 combines the plurality of jobs into one group having the same group number. The display information creating unit 63 stores the relationships between the jobs and the group numbers in the group/job relation table 76.

More specifically, in a case where a group number was assigned to the target job in the antecedent job (S23-5: Yes), when there is a job subsequent to the target job, the display information creating unit 63 determines whether the job classification information of the target job and the subsequent job are the same.

When the target job has the same classification information as the subsequent job, the display information creating unit 63 confirms the group number assigned to the subsequent job. The display information creating unit 63 assigns the group number of the target job to a job that is not assigned a group number, among the subsequent jobs having the same job classification information.

Further, the display information creating unit 63 replaces the group number of a subsequent job assigned a group number, among the subsequent jobs having the same job classification information, with the group number of the target job. Specifically, the display information creating unit 63 changes the group numbers of all the jobs belonging to the group corresponding to the subsequent job to the group number of the group of the target job, based on the group/job relation table 76. The display information creating unit 63 then erases the group to which the subsequent group originally belonged, from the group/job relation table 76 (S23-6).

In a case where a group number was not assigned to the target job in the antecedent job (S23-5: No), when there is a job subsequent to the target job, the display information creating unit 63 determines whether the job classification information of the target job and the subsequent job are the same.

When the target job has the same classification information as the subsequent job, the display information creating unit 63 confirms a group number assigned to the subsequent job. When a group number has previously been assigned to at least one group among the subsequent jobs, the display information creating unit 63 gives the same group number to the target job. The display information creating unit 63 adds the correspondence relation between the target job and the subsequent job to the group/job relation table 76.

When a plurality of subsequent jobs have the same job classification information but have different group numbers, the display information creating unit 63 replaces a group number of jobs belonging to a group having a group number different from the group number first assigned to the target job, with the group number assigned to the target job. Specifically, the display information creating unit 63 changes the group numbers of all the jobs belonging to the groups corresponding to the subsequent jobs, to the group number of the group of the target job in the group/job relation table 76. The display information creating unit 63 then erases the groups to which the subsequent jobs originally belonged, from the group/job relation table 76 (S23-7).

When all the antecedent and subsequent jobs have different job classification information or when group numbers are unassigned because none of the antecedent and subsequent jobs have been confirmed yet, any group number is not assigned to the target job. In this case, a new group number is assigned and added to the correspondence relation in the group/job relation table 76.

The processing in S23-6 or S23-7 is repeated until the confirmation of all the subsequent jobs is completed (S23-4: No).

When the processing in S23-6 or S23-7 is completed for all of the subsequent jobs, the display information creating unit 63 carries out the following processing. When all the antecedent and subsequent jobs have different job classification information or when group numbers are unassigned because none of the antecedent and subsequent jobs have been confirmed yet, any group number is not assigned to the target job. In this case, the display information creating unit 63 assigns a new group number and adds the new group number to the correspondence relation between the target job and the antecedent and subsequent jobs in the group/job relation table 76. The explanation now returns to FIG. 35.

The display information creating unit 63 derives the relationships between the groups (S24). The display information creating unit 63 finds out which groups are subsequent groups to other groups, based on the connection relationships in the job flow in the job relation information table 71 and based on the group/job relation table 76. The display information creating unit 63 adds the found connection relationships between the groups in the subsequent group management table 77. The processing in step S24 is described with reference to FIG. 39.

Figure 39:
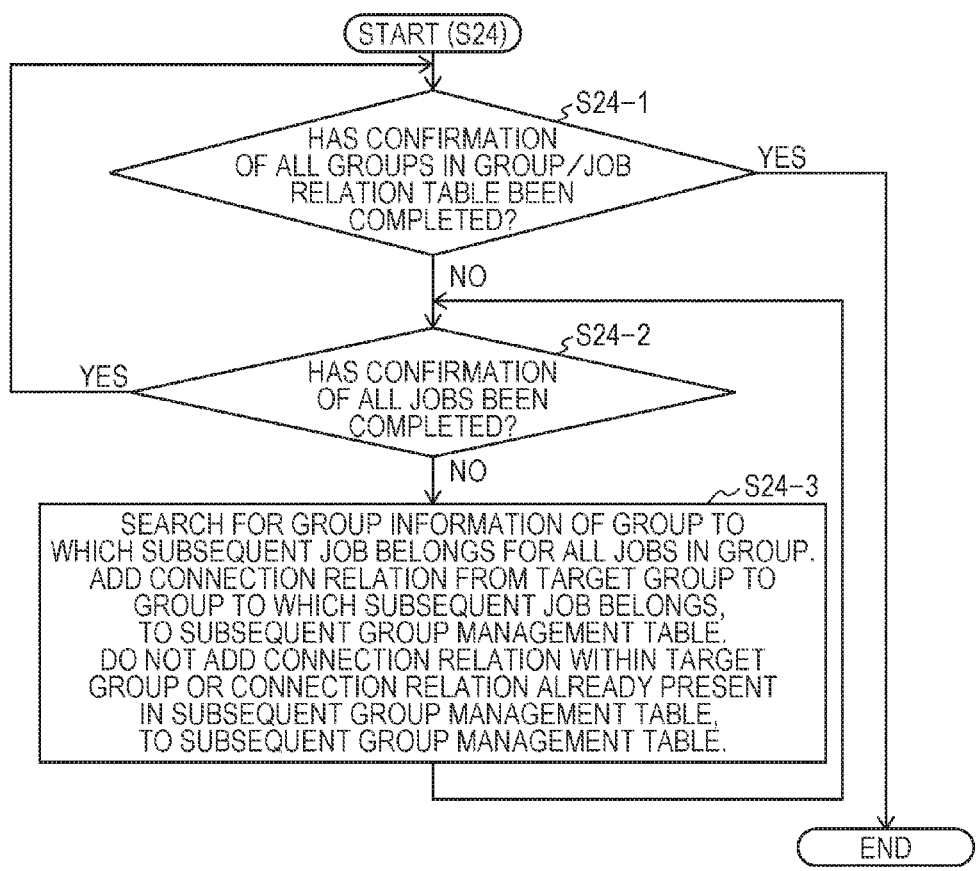
FIG. 39 is a diagram illustrating an example of an operational flowchart of a process for deriving connection relationships between groups, according to an embodiment.

FIG. 39 illustrates an operational flowchart for a process (S24) of deriving connection relationships between groups according to an embodiment. The display information creating unit 63 carries out the following processing until the confirmation of all the groups in the group/job relationship table 76 is completed (S24-1). That is, the display information creating unit 63 finds the group information of the subsequent groups for all the jobs within the group from the group/job relationship table 76. The display information creating unit 63 adds the connection relationships from the target group to a group to which the subsequent job belongs, and adds the connection relationship to the subsequent group management table 77 (S24-3).

When the connection relationship is one within the target group or when the connection relationship is already present in the subsequent group management table 77, the display information creating unit 63 does not add the connection relationship to the subsequent group management table 77.

The processing in S24-3 is repeated until the confirmation is completed for all the jobs (S24-3: No). The explanation now returns to FIG. 35.

The display information creating unit 63 derives a distance from the first job for each job (S25). The display information creating unit 63 finds the distance from the first job to each job, based on the connection relationships of the job flow in the job relation information table 71. The distance from the first job to each job is the number of arrows traversed from the first job until each job is reached.

A plurality of distances from the first job to each job are present if there are a plurality of first jobs or if the route branches in the middle. In this case, the greatest distance to the job is taken as a distance. The display information creating unit 63 stores the derived distance information to each job in the distance management table 75. The processing in step S25 is described with reference to FIG. 40.

Figure 40:
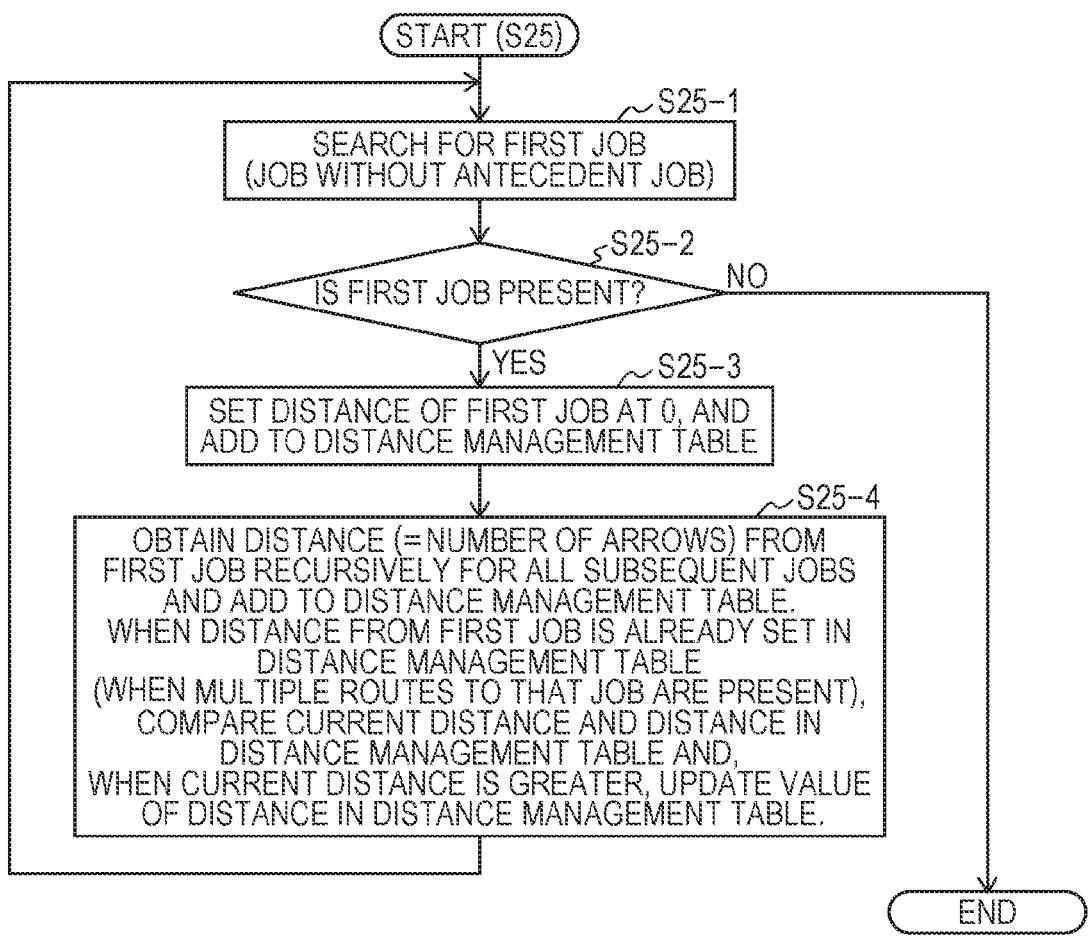
FIG. 40 is a diagram illustrating an example of an operational flowchart of a process for deriving distances from a first job to each job, according to an embodiment.

FIG. 40 illustrates an operational flowchart for a process (S25) of deriving distances from the first job to each job according to an embodiment. The display information creating unit 63 searches for the first job (job without antecedent job) based on the connection relationships of the job flow in the job relation information table 71 (S25-1).

When there is no first job (S25-2: No), the flow is finished. When there is a first job (S25-2: Yes), the display information creating unit 63 sets the distance of the first job at zero, and adds the distance of the first job to the distance management table 75 (S25-2).

The display information creating unit 63 finds the distances (=number of arrows) from the first job recursively for all the subsequent jobs, and adds the distances to the distance management table 75.

When the distance from the first job is already set in the distance management table 75 (when multiple routes to the job are present), the display information creating unit 63 compares the current distance with the distance in the distance management table 75. When the value of the current distance is greater than the value of the distance in the distance management table 75, the display information creating unit 63 updates the value of the distance in the distance management table 75 (S25-4). The explanation now returns to FIG. 35.

The display information creating unit 63 derives the execution intervals and the connecting intervals of the groups (S26). The display information creating unit 63 finds an execution interval of each group and a connecting interval between the groups, based on the subsequent group management table 77 and the distance management table 75. The execution interval of a group is the interval from when the jobs in the group start until all the jobs are finished.

The display information creating unit 63 finds the greatest distance and the smallest distance among the distances of the jobs within each group. The display information creating unit 63 sets the interval from the smallest distance to the greatest distance as a group execution interval and stores the group execution interval in the execution interval management table 74.

A connecting interval between groups indicates an interval in which a certain group is connected to another group when a first job in the certain group is related to a second job in another group, based on the distance between the first and second jobs. The display information creating unit 63 sets the distance from the first job inside the target group to the second job inside another group having a relationship, as a connecting interval between the two groups, and adds the connecting interval to the execution interval management table 74. The processing in step S26 is described with reference to FIG. 41.

Figure 41:
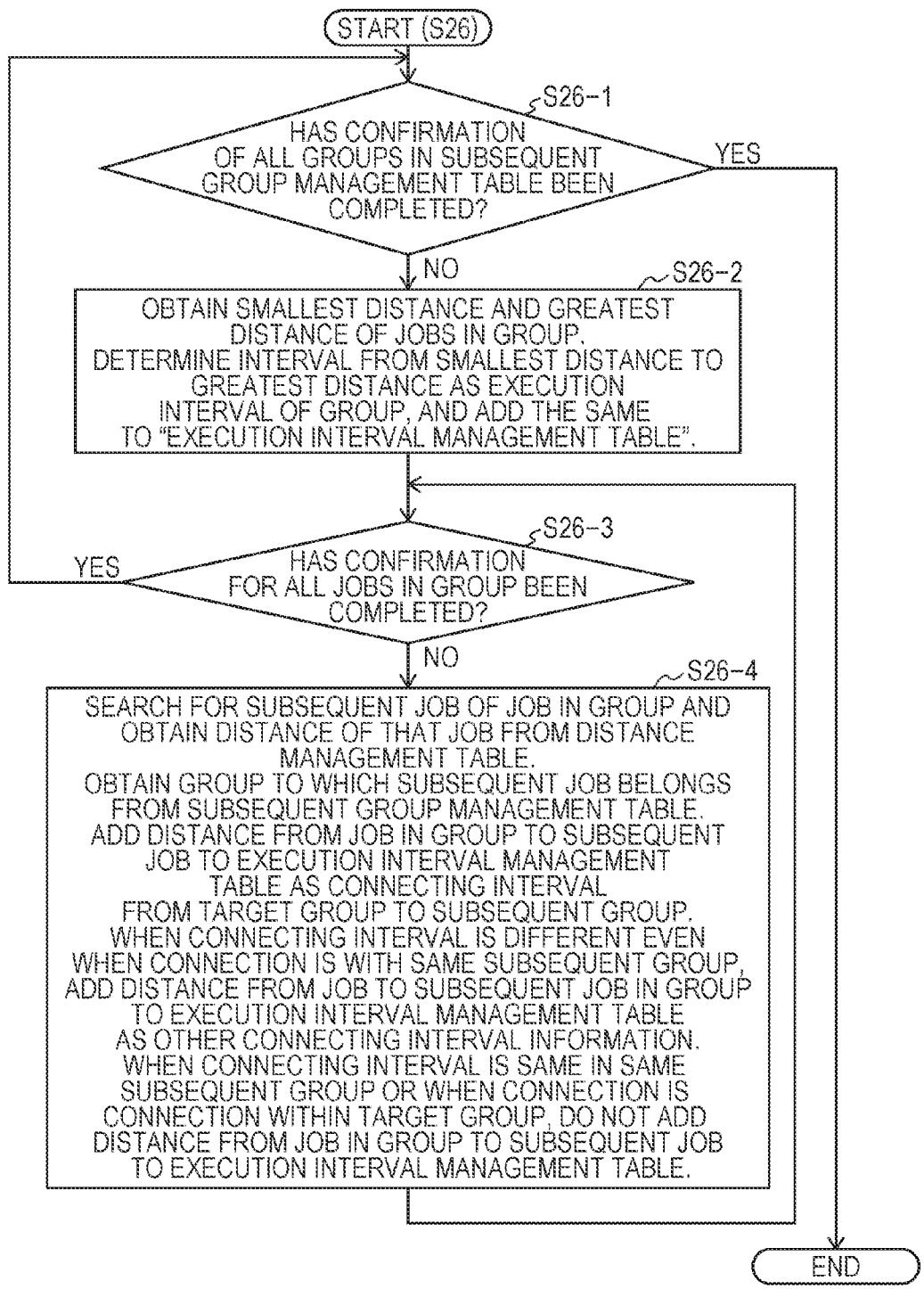
FIG. 41 is a diagram illustrating an example of an operational flowchart of a process for deriving an execution interval and a connecting interval of a group, according to an embodiment.

FIG. 41 illustrates an operational flowchart for a process (S26) of deriving an execution interval and a connecting interval of a group according to an embodiment. The display information creating unit 63 repeats the processing of S26-2 to S26-4 until the confirmation of all the groups in the subsequent group management table 77 is completed.

The display information creating unit 63 refers to the subsequent group management table 77 and the distance management table 75 to find the smallest distance and the greatest distance of the jobs in the group. The display information creating unit 63 sets the found interval from the smallest distance to the greatest distance as the execution interval of the group, and adds the information to the execution interval management table 74 (S26-2).

The display information creating unit 63 carries out the processing in S26-4 after completing the confirmation of all the jobs in the group.

The display information creating unit 63 searches for subsequent jobs of the job in the group, and obtains the distances of those jobs from the distance management table 75. Moreover, the display information creating unit 63 obtains the group to which each subsequent job belongs from the subsequent group management table 77. The display information creating unit 63 adds the distance from the job inside the group to the subsequent job as the connecting interval from the target group to the subsequent group, to the execution interval management table 74.

When a connecting interval is different even in a connection with the same subsequent group, the display information creating unit 63 adds the distance from the job inside the group to the subsequent job as separate connecting interval information in the execution interval management table 74.

Conversely, when the connecting interval with the same subsequent group is the same or when the connection is from the target group to the target group, the display information creating unit 63 does not add the distance from the job inside the group to the subsequent job, to the execution interval management table 74. The explanation now returns to FIG. 35.

The display information creating unit 63 creates a group display table (S27). The display information creating unit 63 refers to the execution interval management table 74 and combines the groups having the same job classification information so that the groups are displayed as one group, and adds the information to the group display table 78.

When the execution intervals of groups overlap when combining the groups, the display information creating unit 63 updates the execution interval information, and when no group execution intervals overlap, the display information creating unit 63 adds new execution interval information.

The display information creating unit 63 refers to the execution interval management table 74 to find the display positions of the arrows for indicating the connection relationships between groups displayed on the screen, based on the connecting interval information before combining, for each of the groups combined as described above, and adds the display positions of the arrows to the group display table 78.

When a plurality of arrows for connecting intervals having the same relationships from a certain group to another group are present in the group combined as above, the display information creating unit 63 combines the arrows described in the table into one arrow in order to display the arrows as one arrow. When the intervals are different, the arrows described in the table are not combined so that the arrows are displayed as different arrows. The processing in step S27 is described with reference to FIG. 42.

Figure 42:
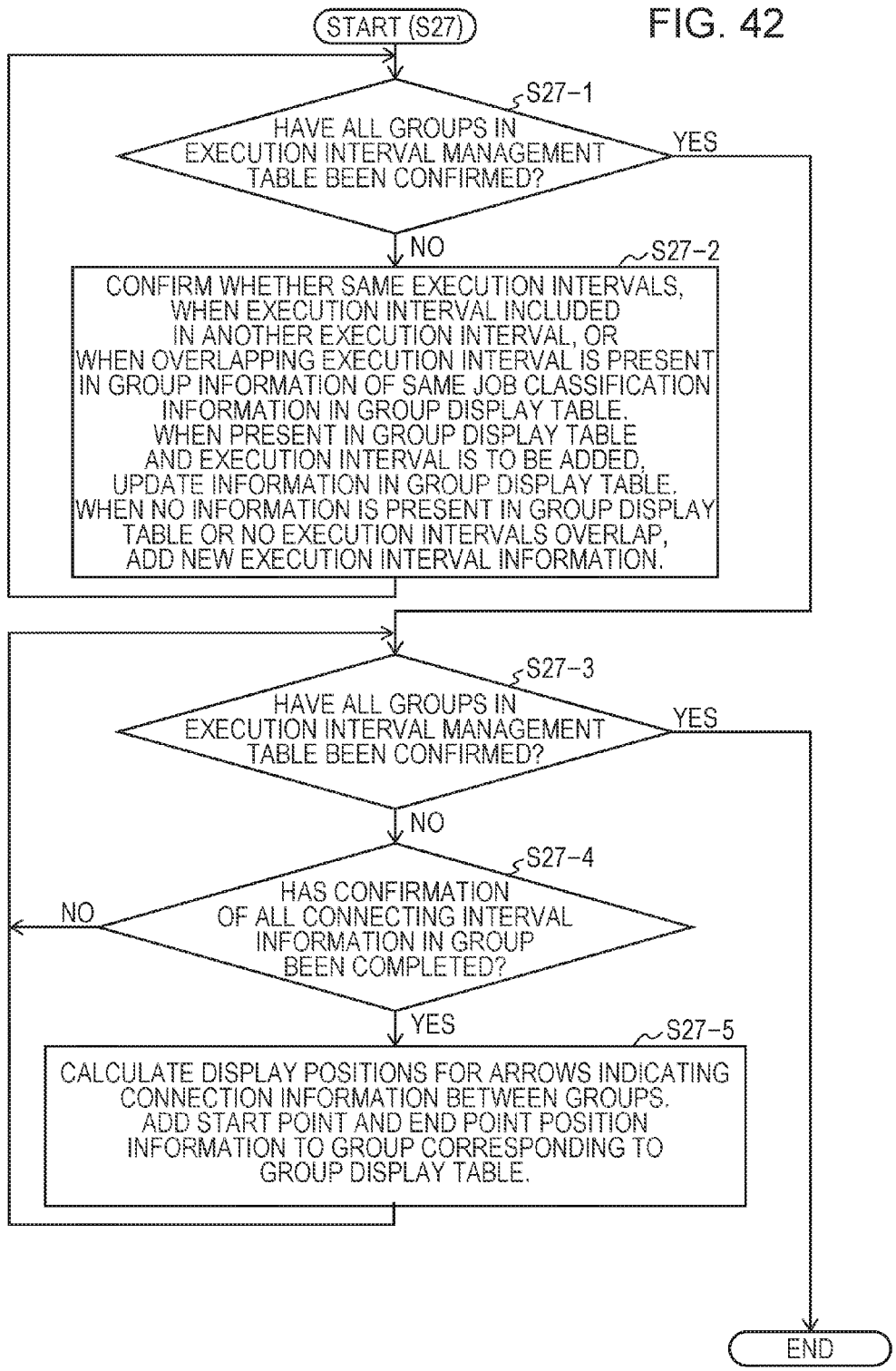
FIG. 42 is a diagram illustrating an example of an operational flowchart of a process for creating the group display table, according to an embodiment.

FIG. 42 illustrates an operational flowchart for a process (S27) of creating the group display table according to an embodiment. The display information creating unit 63 confirms whether any group having the same execution interval, any group having an execution interval included in another execution interval, or any group having overlapping execution interval is present in the group display table 78, based on the group information for groups having the same job classification information. When any of the above groups is present in the group display table 78 and an execution interval is to be added, the display information creating unit 63 updates the information in the group display table 78.

When there exist no information in the group display table 78 or when no execution intervals overlap, the display information creating unit 63 adds new execution interval information (S27-2).

The display information creating unit 63 carries out the processing in S27-2 until confirmation is completed for all the groups in the execution interval management table 74.

After completing the confirmation of all the groups in the execution interval management table 74 (S27-1: Yes), the display information creating unit 63 confirms whether the processing in S27-4 to S27-5 has been carried out for all of the groups in the execution interval management table 74 (S27-3). When the processing in S27-4 to S27-5 has not been carried out for all the groups in the execution interval management table 74 (S27-3: No), the display information creating unit 63 performs the following processing. That is, when the confirmation of all the connecting interval information in the group has been completed (S27-4: Yes), the display information creating unit 63 calculates the display positions of the arrows indicating the connection information between groups. The display start point is the target group and the end point is the subsequent group. The positions of the start point and the end point are determined from the connecting intervals in the execution interval management table 74. The display information creating unit 63 adds the start point and end point position information to the corresponding group in the group display table 78 (S27-5). The explanation now returns to FIG. 35.

The display information creating unit 63 updates the group execution conditions in the group display table 78 (S28). The display information creating unit 63 refers to the execution interval management table 74 and confirms the states of the jobs inside the group. The display information creating unit 63 sets the state and the distance of a job that has a high display priority as the display state of the group and as the display position of the state, and updates the group display table 78. When there are a plurality of jobs having the same priority state, the display information creating unit 63 sets the state and distance of the job with the smallest distance to the display state of the group and the display position of the state.

The display information creating unit 63 refers to the execution interval management table 74 and confirms the closing times of the jobs in the group for each interval and updates the group display table 78. When a plurality of different closing times are present for jobs in the execution intervals in one group, the display information creating unit 63 sets the information of the plurality of closing times within the execution interval of one group in the group display table 78.

Moreover, for cases in which a job has already finished normally or is delayed, the display information creating unit 63 adds an attribute for indicating the completion or the delay to the group display table 78. The display information creating unit 63 is able to indicate whether a job corresponding to the closing time is completed or is delayed when displaying the job flow.

When displaying, for example, the second time around, the speed of the processing may be increased by implementing the processing from S27 onward. The processing in step S28 is described with reference to FIG. 43.

Figure 43:
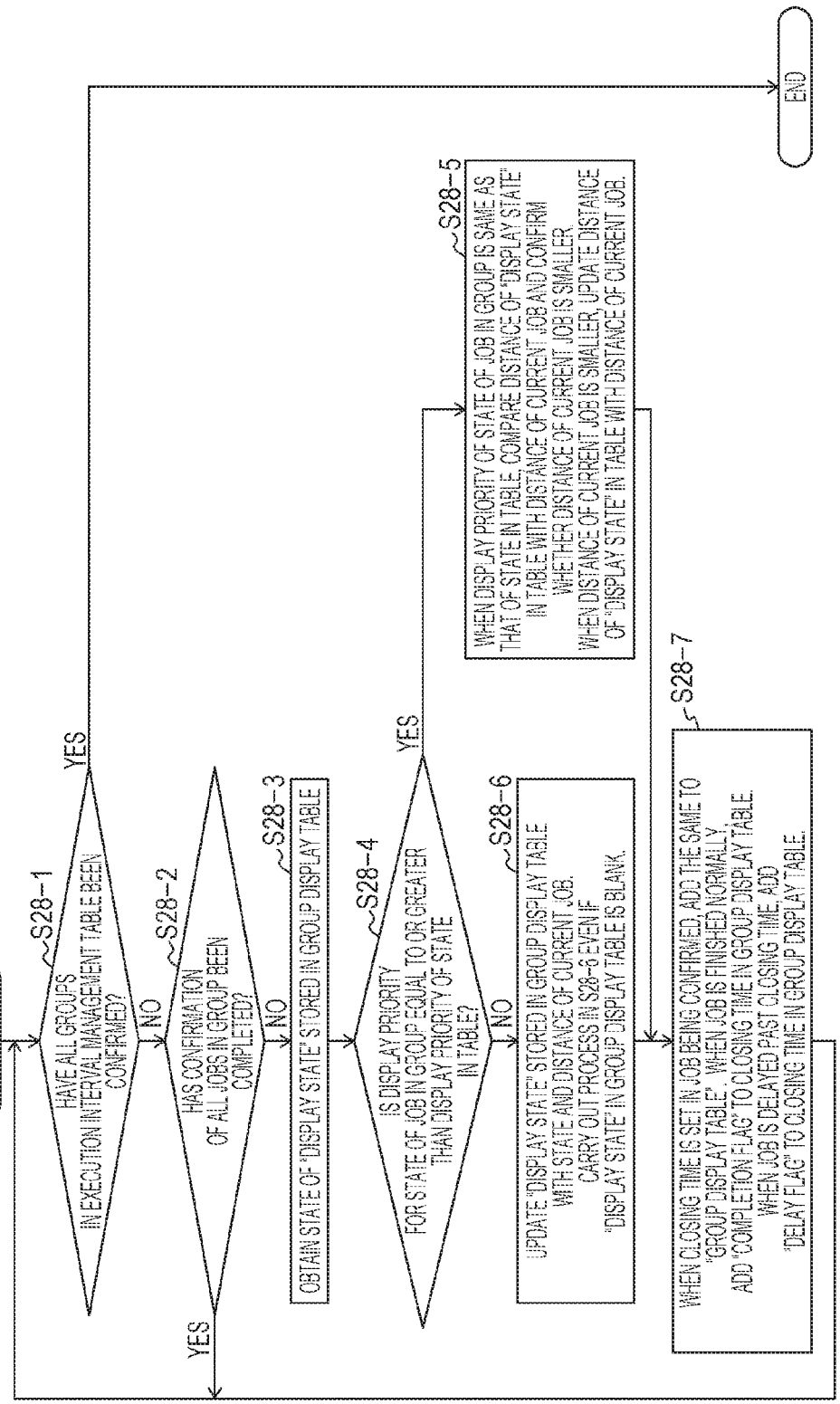
FIG. 43 is a diagram illustrating an example of an operational flowchart of a process for updating group execution conditions in the group display table, according to an embodiment.

FIG. 43 illustrates an operational flowchart for a process (S28) of updating group execution conditions in the group display table according to an embodiment. The display information creating unit 63 carries out the processing from S28-2 to S28-7 until confirmation is completed for all the groups in the execution interval management table 74 (S28-1).

The display information creating unit 63 carries out the processing from S28-2 to S28-7 until confirmation is completed for all the jobs in the group (S28-2).

The display information creating unit 63 obtains the state of the "display state" stored in the group display table 78 (S28-3).

The display information creating unit 63 determines whether the display priority of the state of a job in the group is equal to or greater than the display priority of the state in the group display table 78 (S28-4). When the display priority of the state of a job in the group is equal to or greater than the display priority of the state in the group display table 78 (S28-4: Yes), the display information creating unit 63 carries out the processing in S28-5.

When the display priority of the state of the job in the group is the same as the display priority of the state in the group display table 78, the display information creating unit 63 compares the distance of the "display state" in the group display table 78 with the current job distance. The display information creating unit 63 obtains the information pertaining to the current job via the job execution unit 62. When the distance of the current job is less than the distance of the "display state" in the group display table 78, the display information creating unit 63 updates the distance of the "display state" in the group display table 78 with the distance of the current job (S28-5).

When the display priority of the state of a job in the group is lower than the display priority of the state in the group display table 78 (S28-4: No), the display information creating unit 63 carries out the processing in S28-6.

The display information creating unit 63 updates the "display state" stored in the group display table 78 with the state and distance of the current job (S28-6). The display information creating unit 63 carries out the processing in S28-6 also when the "display state" in the group display table 78 is blank.

When the closing time is set for the job currently being confirmed, the display information creating unit 63 adds the closing time to the group display table 78. Further, the display information creating unit 63 adds a "completion flag" to the closing time in the group display table 78 when the job is finished normally. The display information creating unit 63 adds a "delay flag" to the closing time in the group display table 78 when the job is delayed relative to the closing time (S28-7). The explanation now returns to FIG. 35.

The display information creating unit 63 creates the reduction display table for the group (S29). The processing in step S29 is described with reference to FIGS. 44 and 45.

Figure 44:
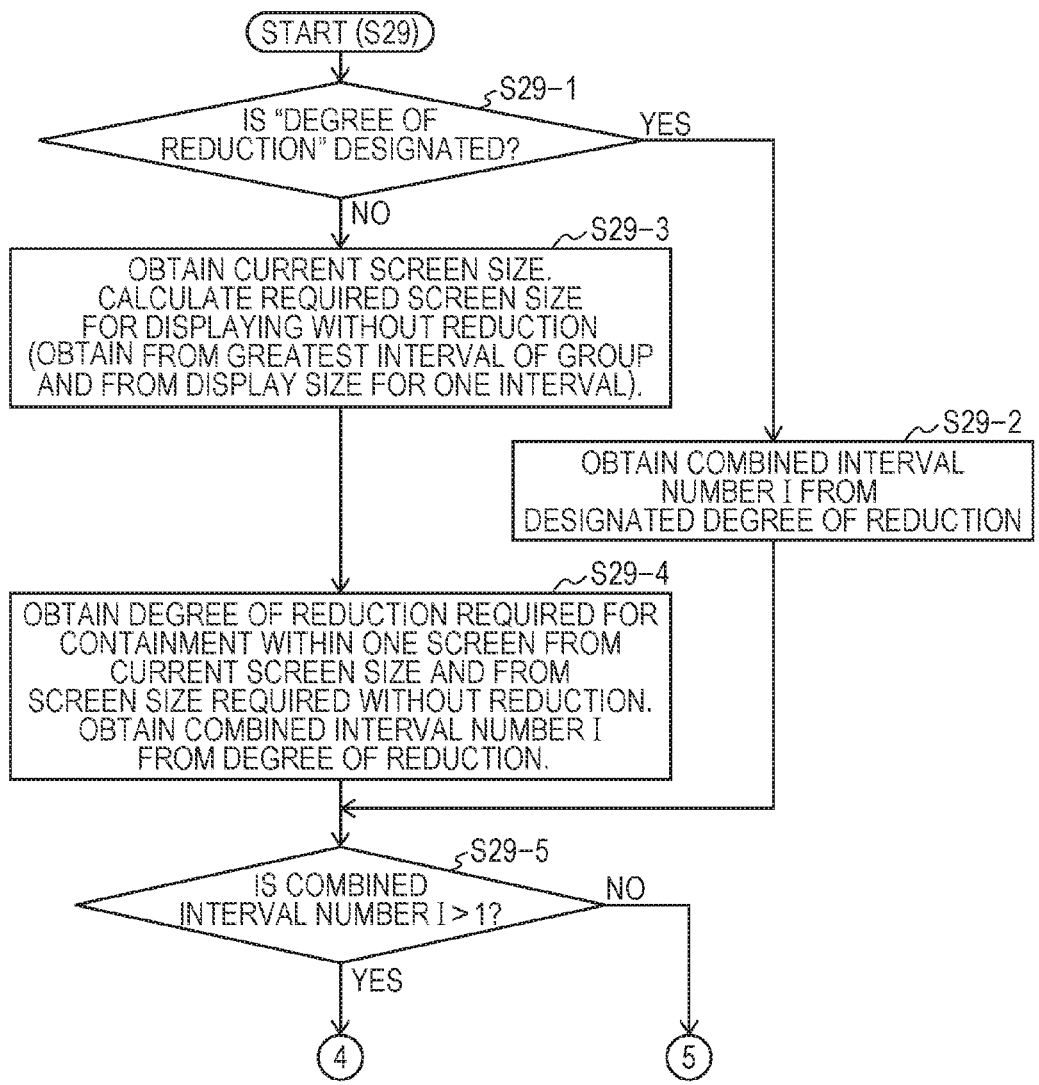
FIG. 44 is a diagram illustrating an example of an operational flowchart of a process for creating group reduction display data, according to an embodiment.
Figure 45:
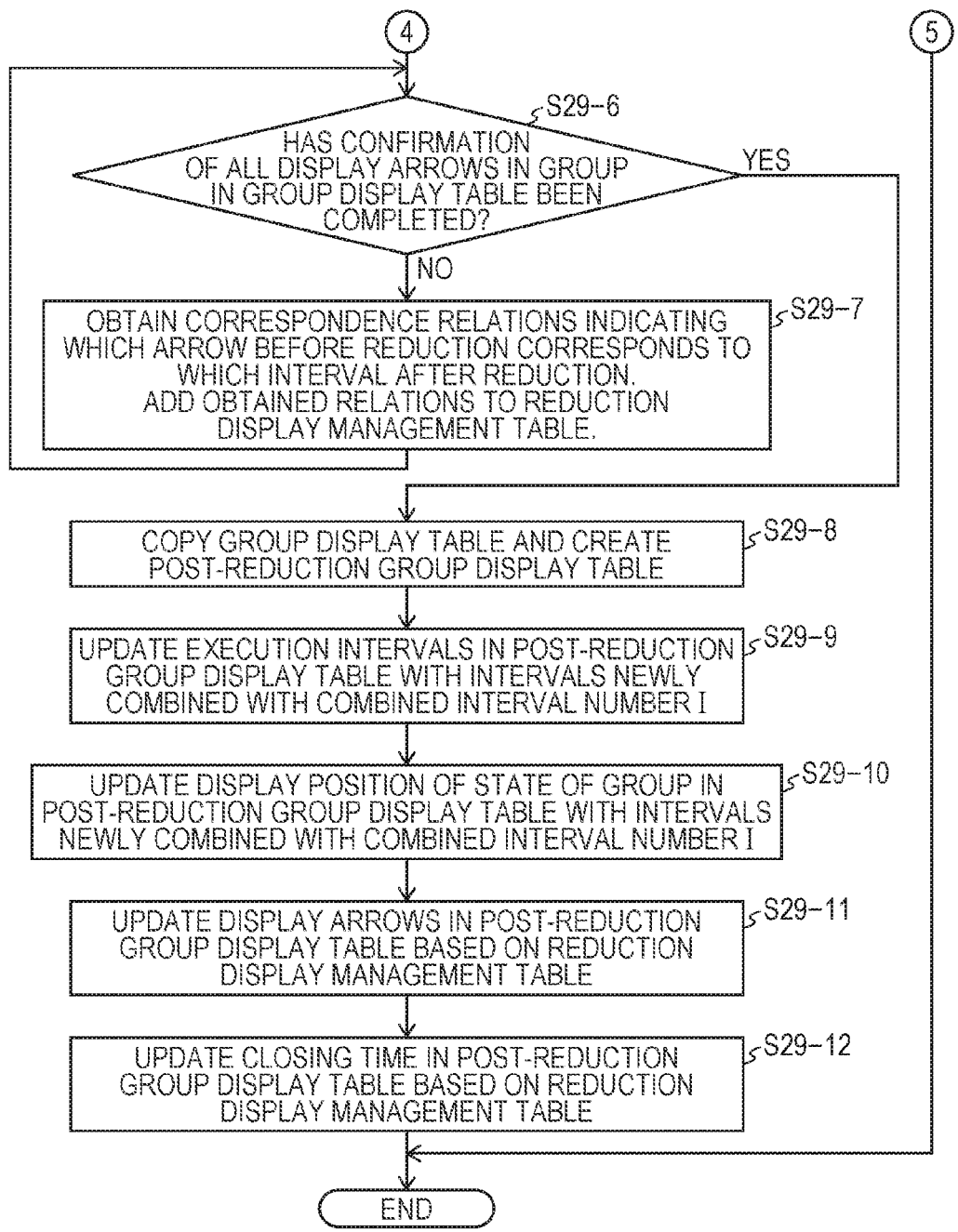
FIG. 45 is a diagram illustrating an example of an operational flowchart of a process for creating group reduction display data, according to an embodiment.

FIGS. 44 and 45 illustrate an operational flowchart for a process (S29) of creating the group reduction display data according to an embodiment. When a degree of reduction of the screen display is designated when the job grouping display is requested (S29-1: Yes), the display information creating unit 63 obtains a combined interval number I indicating the number of intervals that are to be newly combined into one interval, from the designated level of reduction (S29-2). The processing then advances to S29-5.

When the level of reduction of the display screen is not designated when the job grouping display is requested (S29-1: No), the display information creating unit 63 obtains the current screen size. The display information creating unit 63 then calculates the desired screen size for displaying without reduction (from the greatest interval of the group and the display size per one group) (S29-3).

The display information creating unit 63 obtains the degree of reduction desired for containment within one screen from the current screen size and the desired screen size without reduction. The display information creating unit 63 then obtains a combined interval number I indicating the number of intervals that are to be newly combined into one interval, from the degree of reduction (S29-4).

When the combined interval number I is equal to or less than 1, the present flow is finished (S29-5: No). When the combined interval number I is greater than 1 (S29-5: Yes), the routine advances to the processing in S29-6.

After the confirmation of the display arrows of all the groups in the group display table 78 is completed, the display information creating unit 63 carries out the processing in S29-7 (S29-6).

The display information creating unit 63 obtains the correspondence relationship indicating which arrow before reduction corresponds to which interval after reduction, based on the combined interval number I, and adds the information to the reduction display management table 79 (S29-7).

The correspondence relation between the intervals before and after reduction is derived in S29-7 by dividing the number identifying the current interval by the combined interval number I and rounding off the resulting number from the decimal point (e.g., when the combined interval number I is 3, the intervals 0 to 2 before reduction become the interval 0 after reduction, and the intervals 3 to 5 before reduction become the interval 1 after reduction). Arrows in the same interval and having the same relationship between groups are combined as one arrow. When arrows within the same interval are pointing in opposite directions, the arrows are combined as one bi-directional arrow in the display.

After the confirmation of all the display arrows in the group in the group display table 78 has been completed (S29-6: Yes), the display information creating unit 63 copies the group display table 78 and creates the post-reduction group display table 80 (S29-8).

The display information creating unit 63 updates the execution intervals of each group and the display position of states of the groups in the post-reduction group display table 80, based on the combined interval number I (S29-9).

The display information creating unit 63 updates the display position states of the groups in the post-reduction group display table 80 with the new interval combined according to the combined interval number I (S29-10).

The display information creating unit 63 also updates the display arrows in the post-reduction group display table 80, based on the reduction display management table 79 (S29-11).

The display information creating unit 63 updates the closing times in the post-reduction group display table 80, based on the reduction display management table 79 (S29-12). The explanation now returns to FIG. 35.

The display information creating unit 63 transmits the display information for grouping of the job flow to the client 81 (S30). The display information creating unit 63 transmits, to the client 81, the information of the job flow to be displayed and the post-reduction group display table 80 among the post-consolidation batch information.

The display process 82 of the client 81 includes grouping and displaying the job flow, based on the information of the job flow to be displayed and the post-reduction group display table 80 transmitted from the server 39 (S31). As a result, the grouped job flow information (group monitoring diagram) is displayed in a Gantt chart format on the screen of the client 81, based on the information of the job flow and the post-reduction group display table 80. That is, the group monitoring diagram displays the grouped attribute information in the vertical axis and time in the horizontal axis, and displays bars depicting the execution time period of a job as a Gantt chart partitioned into prescribed time period intervals as described with reference to FIGS. 16 and 17.

A job flow within a certain job classification group may be displayed in a drill down manner. In this case, the job flow within the certain group and the previous and subsequent jobs are displayed. For example, when the group B in interval 3 in FIG. 16 is selected, a group list 91 of the job classification information B in the interval 3 is displayed as illustrated in FIG. 46.

The state of the group is displayed in the group list 91 in FIG. 46, and the group name and the state may be sorted. When any group in the group list 91 is selected, the group and the jobs before and after are displayed.

Figure 47:
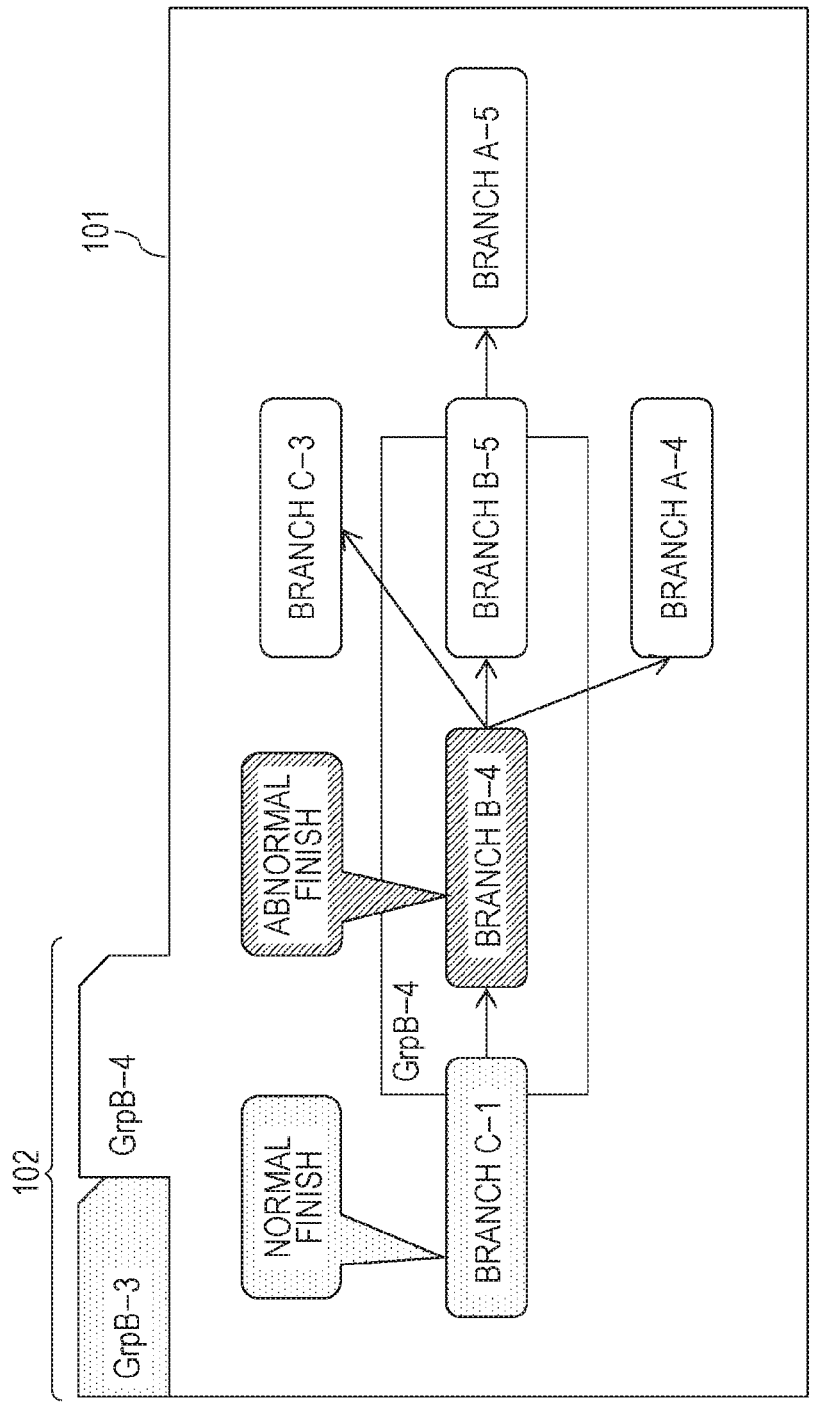
FIG. 47 is a diagram illustrating an example of a screen displayed when GrpB-4 is selected from the group list, according to an embodiment.

FIG. 47 illustrates a screen displayed when GrpB-4 is selected from the group list, according to an embodiment. The job flow of the GrpB-4 and the jobs before and after the GrpB-4 are displayed and the states of the jobs are displayed on a screen 101. The group names described in the group list 91 are displayed on tabs 102. By switching the tabs 102, the job flow within another group may be displayed.

Figure 48:
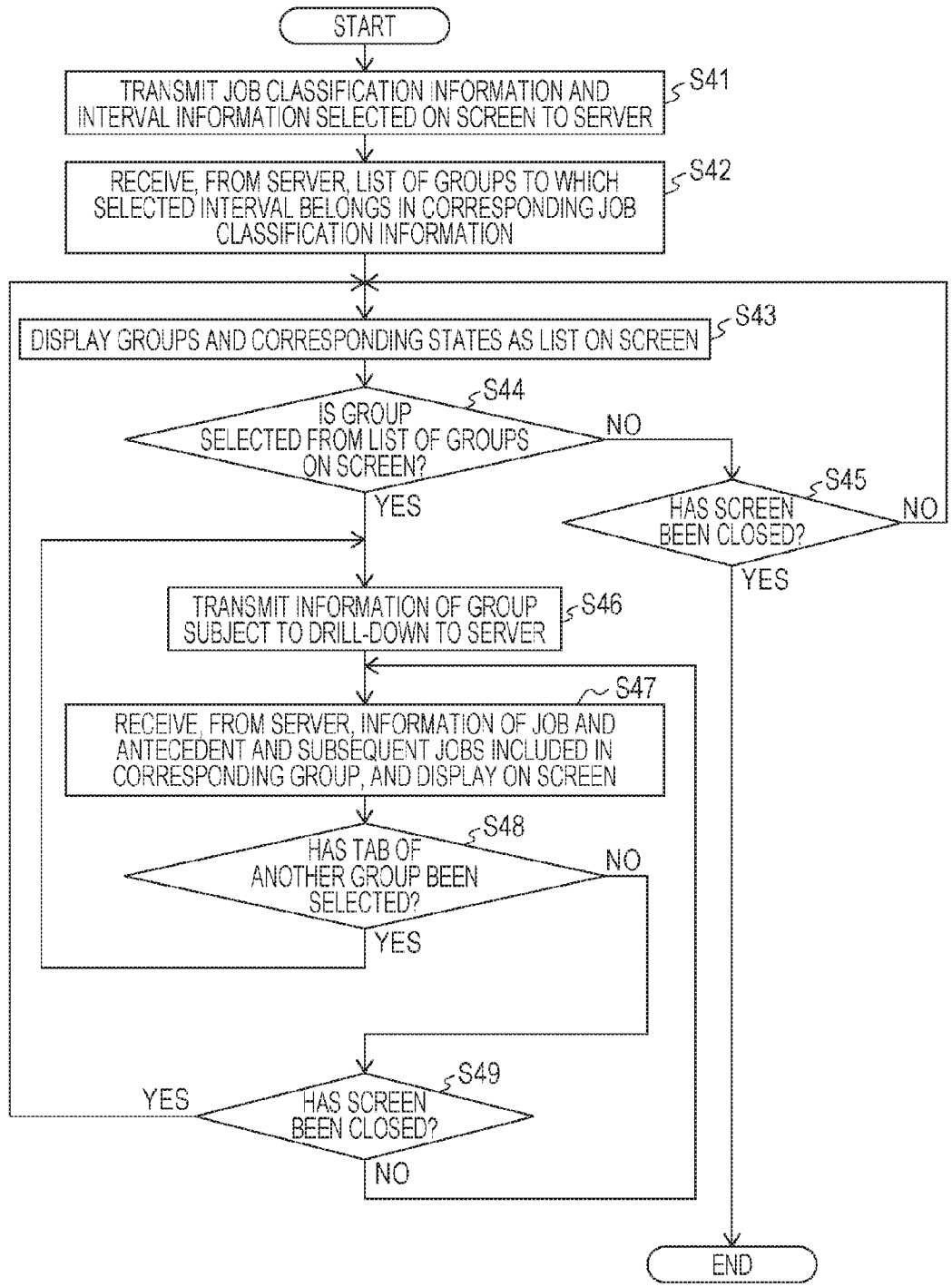
FIG. 48 is a diagram illustrating an example of an operational flowchart of client display processing, according to an embodiment.

FIG. 48 illustrates an operational flowchart of client display processing according to an embodiment. The client 81 transmits the job classification information and the interval information selected on the screen, to the server 39 (S41).

The client 81 receives the group list 91 of the corresponding job classification information, belonging to the selected interval, from the server 39 (S42). The client 81 displays the group and the corresponding state on the screen as the group list 91 (S43).

The client 81 determines whether a group is selected from the group list 91 on the screen (S44). When no group is selected from the group list 91 on the screen (S44: No), and when the screen is not closed (S45: No), the client 81 carries out the processing in S43. When no group is selected from the group list 91 on the screen (S44: No), and when the screen is closed (S45: Yes), the client 81 finishes the present flow.

When a group is selected from the group list 91 on the screen (S44: Yes), the client 81 transmits the information of the group to be subjected to drill-down, to the server 39 (S46).

The client 81 receives the information of the job included in the corresponding group and the information of the previous and subsequent jobs from the server 39 and displays the information on the screen 101 (S47).

When the tab 102 of another group is selected (S48: Yes), the client 81 carries out the processing in S46.

When the tab 102 of another group is not selected (S48: No) and the screen 101 is not closed (S49: No), the client 81 carries out the processing in S47. When the tab 102 of another group is not selected (S48: No) and the screen 101 is closed (S49: Yes), the client 81 carries out the processing in S43.

Figure 49:
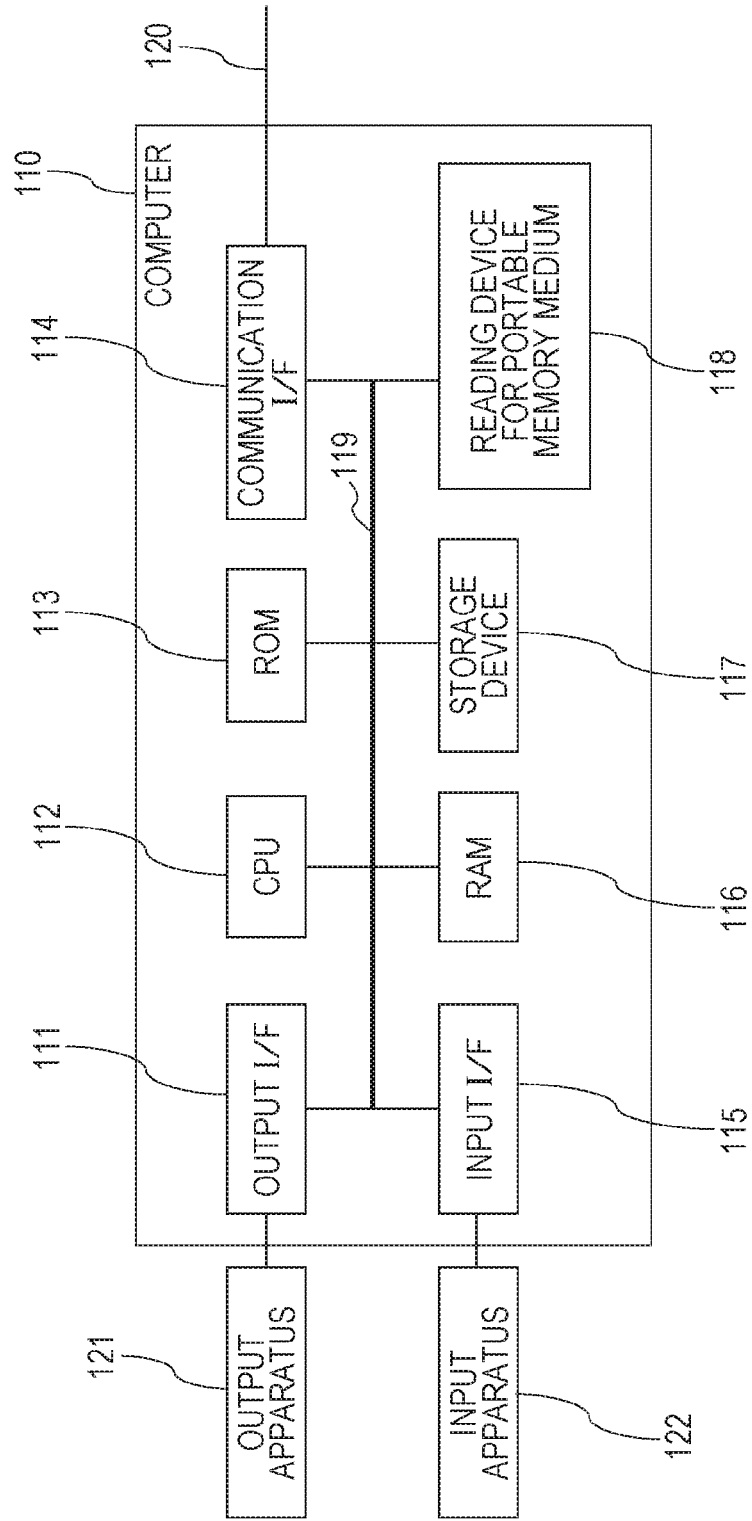
FIG. 49 is a diagram illustrating an example of a configuration of a hardware environment of a computer for executing a program, according to an embodiment.

FIG. 49 is an example of a configuration of a hardware environment in a computer for executing a program according to an embodiment. A computer 110 functions as the server 39, the client 81, and the like. The computer 110 is configured by a CPU 112, a ROM 113, a RAM 116, a communication I/F 114, a storage device 117, an output I/F 111, an input I/F 115, a reading device 118, a bus 119, an output apparatus 121, and an input apparatus 122.

CPU is a central computing unit. ROM is a read-only memory. RAM is a random access memory. I/F is an interface. The CPU 112, the ROM 113, the RAM 116, the communication I/F 114, the storage device 117, the output I/F 111, the input I/F 115, and the reading device 118 are connected through the bus 119. The reading device 118 is a device for reading a portable recording medium. The output apparatus 121 is connected to the output I/F 111. The input apparatus 122 is connected to the input I/F 115.

A storage device of various types, such as a hard disk, a flash memory, or a magnetic disc, may be used as the storage device 117. The storage device 117 or the ROM 113 stores a program, according to an embodiment, for causing the CPU 112 to function as the grouping unit 3. The RAM 116 temporarily stores information. When the computer 110 is the server 39, the RAM 116 functions as the memory 67 and temporarily holds various tables. Moreover, when the computer 110 is the client 81, the RAM 116 stores the display information for grouping the job flow received from the server 39.

The CPU 112 reads a program according to an embodiment, from the storage device 117 or the ROM 113, and executes the program as a control unit 22. The CPU 112 specifically executes the transfer tool 33 and the registration tool 37. Moreover, the CPU 112 executes the scheduler 61 and further functions as the job execution unit 62 and the display information creating unit 63.

The program for realizing the processing described in the above embodiment may be received from a program supplier side via a communication network 120 and the communication I/F 114, and may be stored, for example, in the storage device 117. Moreover, the program for realizing the processing described in the above embodiment may be stored in a commercialized and distributed portable storage medium. In this case, the portable storage medium may be set in the reading device 118 and the program may be read by the CPU 112 and executed. A CD-ROM, a flexible disk, an optical disk, a magneto-optic disc, an IC card, a USB memory device or other storage medium format may be used as the portable storage medium. The program stored in the above type of storage medium is read by the reading device 118.

Further, a keyboard, a mouse, an electronic camera, a web camera, a microphone, a scanner, a sensor, or a tablet may be used in the input apparatus 122. A display, a printer or a speaker may be used in the output apparatus 121. The network 120 may be a communication network such as the Internet, a LAN, a WAN, an exclusive line, or a wired or a wireless communication network.

Embodiments are not limited to the embodiments described above and various configurations or embodiments may be assumed without departing from the spirit of the present embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory, computer-readable recording medium having stored therein a program for causing a computer in an information processing system to execute a process, the process comprising:
in response to a request from a monitoring terminal, creating, based on attribute information of a plurality of jobs included in job flows to be managed, classification information in which the plurality of jobs are classified by attributes thereof;
grouping the plurality of jobs into a plurality of groups according to the attribute information by using the classification information and transition relationship information indicating transition relationships between the plurality of jobs in the job flows; and
creating job-execution-schedule display information with which a transition relationship between a first job and a second job subsequent to the first job among the plurality of jobs is displayed when the first and second jobs belong to different groups, and with which an execution interval of jobs in each group is displayed in association with an execution interval of jobs in another group, based on a number of jobs that have been sequentially executed from a starting job to each job in a job flow.

2. The non-transitory, computer-readable recording medium of claim 1, wherein:
the attribute information includes information on an execution condition of each of the plurality of jobs.

3. The non-transitory, computer-readable recording medium of claim 1, wherein:
the attribute information includes a name assigned to each of the plurality of jobs or information on a group to which each job belongs.

4. An apparatus for managing job flows in an information processing system, the apparatus comprising:
a processor configured to:
in response to a request from a monitoring terminal, create, based on attribute information of a plurality of jobs included in job flows to be managed, classification information in which the plurality of jobs are classified by attributes thereof,
group the plurality of jobs into a plurality of groups according to the attribute information by using the classification information and transition relationship information indicating transition relationships between the plurality of jobs in the job flows, and
create job-execution-schedule display information with which a transition relationship between a first job and a second job subsequent to the first job among the plurality of jobs is displayed when the first and second jobs belong to different groups, and with which an execution interval of jobs in each group is displayed in association with an execution interval of jobs in another group, based on a number of jobs that have been sequentially executed from a starting job to each job in a job flow; and
a memory coupled to the processor, the memory being configured to store the classification information and the job-execution-schedule display information.

5. A method for managing job flows in an information processing system, the method comprising:
in response to a request from a monitoring terminal, creating, based on attribute information of a plurality of jobs included in job flows to be managed, classification information in which the plurality of jobs are classified by attributes thereof;
grouping the plurality of jobs into a plurality of groups according to the attribute information by using the classification information and transition relationship information indicating transition relationships between the plurality of jobs in the job flows; and
creating job-execution-schedule display information with which a transition relationship between a first job and a second job subsequent to the first job among the plurality of jobs is displayed when the first and second jobs belong to different groups, and with which an execution interval of jobs in each group is displayed in association with an execution interval of jobs in another group, based on a number of jobs that have been sequentially executed from a starting job to each job in a job flow.

* * * * *